US012792771B2

(12) United States Patent
Baskaran et al.

(10) Patent No.: US 12,792,771 B2
(45) Date of Patent: Nov. 10, 2026

(54) SECURE USER CONSENT DATA NOTIFICATION

(71) Applicant: Lenovo (Singapore) Pte. Limited, Singapore (SG)

(72) Inventors: Sheeba Backia Mary Baskaran, Friedrichsdorf (DE); Andreas Kunz, Ladenburg (DE)

(73) Assignee: Lenovo (Singapore) Pte. Limited, Singapore (SG)

( * ) Notice: Subject to any disclaimer, the term of this patent is extended or adjusted under 35 U.S.C. 154(b) by 67 days.

(21) Appl. No.: 18/833,276

(22) PCT Filed: Jan. 27, 2023

(86) PCT No.: PCT/IB2023/050733
§ 371 (c)(1),
(2) Date: Jul. 25, 2024

(87) PCT Pub. No.: WO2023/144744
PCT Pub. Date: Aug. 3, 2023

(65) Prior Publication Data
US 2025/0094627 A1 Mar. 20, 2025

Related U.S. Application Data

(60) Provisional application No. 63/304,390, filed on Jan. 28, 2022.

(51) Int. Cl.
*G06F 21/62* (2013.01)
*H04L 67/02* (2022.01)
(Continued)

(52) U.S. Cl.
CPC ...... *G06F 21/6245* (2013.01); *H04W 12/041* (2021.01); *H04W 12/69* (2021.01)

(58) Field of Classification Search
CPC . G06F 21/6245; H04W 12/041; H04W 12/69; H04L 67/02; H04L 12/06; H04L 12/08
See application file for complete search history.

(56) References Cited

U.S. PATENT DOCUMENTS

2019/0149576 A1 5/2019 Rajadurai et al.
2020/0204527 A1* 6/2020 Vass ...................... G06F 21/602
(Continued)

FOREIGN PATENT DOCUMENTS

WO 2019194242 A1 10/2019
WO 2022195878 A1 9/2022
(Continued)

OTHER PUBLICATIONS

Non-Final Office Action issued in U.S. Appl. No. 18/833,281, mailed Dec. 30, 2025, 21 pages.
(Continued)

*Primary Examiner* — Andrew Suh
(74) *Attorney, Agent, or Firm* — FIG. 1 Patents

(57) ABSTRACT

Various aspects of the present disclosure relate to a user equipment (UE) that transmits information, such as to a common application programming interface framework (CAPIF) function or to a core network function (CNF), to trigger a user consent provisioning procedure. The UE also transmits a data exposure notification comprising at least user consent data, and the UE receives a data exposure response acknowledgement (ACK) that indicates the user consent data is stored for reference of the user consent.

20 Claims, 10 Drawing Sheets

(51) Int. Cl.

| | |
|---|---|
| *H04W 12/041* | (2021.01) |
| *H04W 12/06* | (2021.01) |
| *H04W 12/08* | (2021.01) |
| *H04W 12/69* | (2021.01) |

(56) References Cited

U.S. PATENT DOCUMENTS

| | | | | |
|---|---|---|---|---|
| 2021/0037007 | A1 | 2/2021 | Gupta et al. | |
| 2021/0144550 | A1* | 5/2021 | Ito | H04W 12/069 |
| 2022/0174585 | A1 | 6/2022 | Ge et al. | |
| 2023/0113108 | A1 | 4/2023 | Tao et al. | |
| 2023/0164553 | A1 | 5/2023 | Rajadurai et al. | |
| 2023/0209329 | A1* | 6/2023 | Guo | H04W 4/50 455/418 |
| 2024/0155478 | A1* | 5/2024 | Gandikota | H04L 45/64 |
| 2025/0008309 | A1* | 1/2025 | Kim | H04W 60/00 |
| 2025/0126469 | A1 | 4/2025 | Baskaran et al. | |
| 2025/0133399 | A1 | 4/2025 | Baskaran et al. | |
| 2025/0167994 | A1 | 5/2025 | Baskaran et al. | |

FOREIGN PATENT DOCUMENTS

| | | | |
|---|---|---|---|
| WO | 2023084606 | A1 | 5/2023 |
| WO | 2023144649 | A1 | 8/2023 |
| WO | 2023144650 | A1 | 8/2023 |
| WO | 2023144681 | A1 | 8/2023 |
| WO | 2023144774 | A1 | 8/2023 |

OTHER PUBLICATIONS

Restriction Requirement issued in U.S. Appl. No. 18/833,248, mailed Nov. 19, 2025, 8 pages.

"Technical Specification Group Services and System Aspects; Study on application Group Services and System Aspects", 3GPP TR 23.700-95 V1.0.0 [retrieved Apr. 4, 2023]. Retrieved from the Internet <https://ftp.3gpp.org/tsg_sa/WG6_MissionCritical/Latest_draft_SA6_Specs/for_check ing/DRAFT_SP-211508_Presentation_of_TR_23>., Nov. 2021, 15 Pages.

U.S. Appl. No. 18/833,281, filed Jul. 25, 2024 , "Pursuant to MPEP § 2001.06(b) the applicant brings the following co-pending application to the Examiner's attention:", U.S. Appl. No. 18/833,281, filed Jul. 25, 2024, 110 pages.

23701818.9 , "Communication Pursuant to Rules 161(1) and 162 Epc", Ep Application No. 23701818.9, Sep. 4, 2024, 3 pages.

3GPP , "Security architecture and procedures for 5G system", 3GPP TS 33.501 V17.4.2, Release 17 [retrieved Apr. 6, 2023]. Retrieved from the Internet <https://portal.3gpp.org/desktopmodules/Specifications/SpecificationDetails.aspx?specificationld=3169>., Jan. 2022, 287 Pages.

3GPP , "Security aspects of Common API Framework (CAPIF) for 3GPP northbound APIs", 3GPP TS 33.122 version 16.3.0 Release 16 [retrieved Apr. 6, 2023]. Retrieved from the Internet <https://www.etsi.org/deliver/etsi_ts/133100_133199/133122/16.03.00_60/ts_133122v160300p.pdf>., Aug. 2020, 32 Pages.

3GPP , "Technical Specification Group Services and System Aspects; Functional architecture and information flows to support Common API Framework for 3GPP Northbound APIs", 3GPP TS 23.222 V16.4.0 [retrieved Jun. 15, 2019]. Retrieved from the Internet <http://www.3gpp.org>, Jun. 2019, 113 pages.

3GPP , "Technical Specification Group Services and System Aspects; Study on Security Aspects of Enhancement of Support for Edge Computing in 5GC (Release 17)", 3GPP TR 33.839 V0.4.0 [retrieved Mar. 12, 2021]. Retrieved from the Internet <www.3gpp.org>, Jan. 2021, 56 pages.

U.S. Appl. No. 63/304,390 , "Pursuant to MPEP § 2001.06(b) the applicant brings the following co-pending application to the Examiner's attention:", U.S. Appl. No. 63/304,390, filed Jan. 28, 2022, 51 pages.

Baskaran, Sheeba Backia Mary , et al., "Pursuant to MPEP § 2001.06(b) the applicant brings the following co-pending application to the Examiner's attention:", U.S. Appl. No. 63/304,251, filed Jan. 28, 2022, 109 pages.

Baskaran, Sheeba Backia Mary , et al., "Pursuant to MPEP § 2001.06(b) the applicant brings the following co-pending application to the Examiner's attention:", U.S. Appl. No. 63/304,261, filed Jan. 28, 2022, 79 pages.

Baskaran, Sheeba Backia Mary , et al., "Pursuant to MPEP § 2001.06(b) the applicant brings the following co-pending application to the Examiner's attention:", U.S. Appl. No. 18/833,248, filed Jul. 25, 2024, 110 pages.

Baskaran, Sheeba Backia Mary , et al., "Pursuant to MPEP § 2001.06(b) the applicant brings the following co-pending application to the Examiner's attention:", U.S. Appl. No. 18/833,549, filed Jul. 26, 2024, 80 pages.

Lenovo , "Solution to address KI#2", 3GPP TSG-SA3 Meeting #109AdHoc-e, S3-230070 [retrieved Apr. 5, 2023]. Retrieved from the Internet <URL:https://www.3gpp.org/ftp/TSG_SA/WG3_Security/TSGS3_109AdHoc-e/Docs/S3-230070>., Jan. 2023, 3 Pages.

LTE , "Security Aspects of Common API Framework for 3GPP Northbound APIs", ETSI TS 133 122 V15.0.0, 3GPP TS 33.122 version 15.0.0 Release 15 [retrieved Mar. 3, 2023]. Retrieved from the Internet <https://www.etsi.org/deliver/etsi_ts/133100_133199/133122/15.00.00_60/ts_133122v150000p.pdf>, Sep. 2018, 25 pages.

NEC , "Security procedure for the AEF to obtain API invoker's authorization rights", 3GPP TSG SA WG3 (Security) Meeting #91, S3-181364 revision of S3-18xabc, Belgrade (Serbia) [retrieved Mar. 3, 2023]. Retrieved from the Internet <https://www.3gpp.org/ftp/TSG_SA/WG3_Security/TSGS3_91_Belgrade/Docs/>, Apr. 2018, 6 pages.

NTT DOCOMO , "Discussion on the resource owner registration handling function", 3GPP TSG-SA WG6 Meeting #46-e, S6-212538, e-meeting [retrieved Apr. 1, 2023]. Retrieved from the Internet <https://www.3gpp.org/ftp/tsg_sa/WG6_MissionCritical/TSGS6_046-e/Docs/?sortby=date>., Nov. 2021, 10 Pages.

NTT DOCOMO , "Updating user consent", 3GPP TSG-SA WG6 Meeting #46-e, S6-212541, e-meeting [retrieved Apr. 1, 2023]. Retrieved from the Internet <https://www.3gpp.org/ftp/tsg_sa/WG6_MissionCritical/TSGS6_046-e/Docs/?sortby=date>., Nov. 2021, 1 Page.

PCT/IB2023/050340 , "International Search Report and Written Opinion", PCT Application No. PCT/IB2023/050340, Mar. 7, 2023, 16 pages.

PCT/IB2023/050342 , "International Search Report and Written Opinion", PCT Application No. PCT/IB2023/050342, Mar. 7, 2023, 15 pages.

PCT/IB2023/050556 , "International Search Report and Written Opinion", PCT Application No. PCT/IB2023/050556, May 22, 2023, 21 pages.

PCT/IB2023/050556 , "Invitation to Pay Additional Fees and, Where Applicable, Protest Fee", PCT Application No. PCT/IB2023/050556, Mar. 27, 2023, 14 pages.

PCT/IB2023/050733 , "International Search Report and Written Opinion", PCT Application No. PCT/IB2023/050733, Mar. 22, 2023, 12 pages.

TSG-SA3 , "Presentation of Report to TSG: TR 33.839, Version 1.0.0", 3GPP TSG-SA Meeting #94-e, SP-211403, Online [retrieved Apr. 6, 2023]. Retrieved from the Internet <https://www.3gpp.org/ftp/tsg_sa/TSG_SA/TSGS_94E_Electronic_2021_12/Docs/?sortby=size>., Dec. 2021, 1 Page.

"Extended European Search Report", EP Application No. 25156744.2, Apr. 29, 2025, 13 pages.

"Security aspects of Common API Framework (CAPIF) for 3GPP northbound APIs (Release 16)", 3GPP; Technical Specification Group Services and System Aspects; 3GPP TS 33.122 V16.3.0 (Jul. 2020) [Retrieved from the Internet] <ftp://ftp.3gpp.org/Specs/archive/33_series/33.122/33122-g30.zip33122-g30.doc>, Jul. 2020, 30 pages.

Baskaran, et al., "Pursuant to MPEP § 2001.06(b) the applicant brings the following application to the Examiner's attention:", US Application No. 3/304,229, Jan. 28, 2022, 109 pages.

NTT DOCOMO, "API invoker obtaining authorisation from a remote resource owner", 3GPP TSG-SA WG6 Meeting #45-e,

(56) References Cited

OTHER PUBLICATIONS

S6-211877, e-meeting, Aug. 2021 [Retrieved from the Internet] <https://ftp.3gpp.org/tsg_sa/WG6_MissionCritical/TSGS6_045-e/Docs/S6-211877.zip S6-211877_API invoker obtaining authorisation from a remote resource owner.doc>, Aug. 2021, 2 pages.
NTT DOCOMO, "Obtaining user consent via CAPIF-8", 3GPP TSG-SA WG6 Meeting #45-bis-e, S6-212243, e-meeting, Oct. 11, 2021-Oct. 19, 2021. [Retrieved from the Internet] <https://ftp.3gpp.org/tsg_sa/WG6_MissionCritical/TSGS6_045-bis-e/docs/S6-212243.zip S6-212243_Obtaining user consent viaCAPIF-8.doc>, Oct. 2021, 5 pages.
3GPP, "Authentication and Key Management for Applications (AKMA) based on 3GPP credentials in the 5G System (5GS)", TS 133 535 V16.1.0, Nov. 2020, 21 pages.
3GPP, "Common API Framework for 3GPP Northbound APIs", TS 129 222 V16.5.0, Jan. 2021, 153 pages.
Advisory Action issued in U.S. Appl. No. 18/833,281, mailed Jun. 16, 2026, 2 pages.
Final Office Action issued in U.S. Appl. No. 18/833,281, mailed Apr. 14, 2026, 25 pages.
Non-Final Office Action issued in U.S. Appl. No. 18/833,248, mailed May 15, 2026, 12 pages.
Non-Final Office Action issued in U.S. Appl. No. 18/833,549, mailed May 6, 2026, 27 pages.
Final Office Action issued in U.S. Appl. No. 18/833,248, mailed Sep. 22, 2026, 13 pages.
Notice of Allowance issued in U.S. Appl. No. 18/833,281, mailed Jul. 24, 2026, 9 pages.

* cited by examiner

SECURE USER CONSENT DATA NOTIFICATION

RELATED APPLICATION

This application claims priority to U.S. Patent Application Ser. No. 63/304,390 filed Jan. 28, 2022 entitled "Secure User Consent Data Notification," the disclosure of which is incorporated by reference herein in its entirety.

TECHNICAL FIELD

The present disclosure relates to wireless communications, and more specifically to secure user consent data notification.

BACKGROUND

A wireless communications system may include one or multiple network communication devices, such as base stations, which may be otherwise known as an eNodeB (eNB), a next-generation NodeB (gNB), or other suitable terminology. Each network communication device, such as a base station, may support wireless communications for one or multiple user communication devices, which may be otherwise known as user equipment (UE), or other suitable terminology. The wireless communications system may support wireless communications with one or multiple user communication devices by utilizing resources of the wireless communication system, such as time resources (e.g., symbols, slots, subslots, mini-slots, aggregated slots, subframes, frames, or the like) or frequency resources (e.g., subcarriers, carriers). Additionally, the wireless communications system may support wireless communications across various radio access technologies (RATs) including third generation (3G) RAT, fourth generation (4G) RAT, fifth generation (5G) RAT, and other suitable RATs beyond 5G. In some cases, a wireless communications system may be a non-terrestrial network (NTN), which may support various communication devices for wireless communications in the NTN. For example, an NTN may include network entities onboard non-terrestrial vehicles such as satellites, unmanned aerial vehicles (UAV), and high-altitude platforms systems (HAPS), as well as network entities on the ground, such as gateway entities capable of transmitting and receiving over long distances.

Some wireless communications systems, such as 5G systems (5GS), support user consent for accessing data. This user consent, however, is static in nature. For example, when a user establishes a subscription with an operator, high level general consent data is received from a UE and stored as part of the subscription data. When a service subsequently requests data, this consent data is used to determine whether to provide the requested data.

SUMMARY

The present disclosure relates to methods, apparatuses, and systems that support secure user consent data notification, such as for a user equipment (UE) (resource owner or user) that can provide, update, and revoke user consent data to a common application programming interface (API) framework (CAPIF) function or core network function (CNF) in a real-time and secured manner. The resource owner can securely provide user consent data to the CAPIF function based on a key derived from CAPIF security context. After registration to the network, the UE can trigger the user consent provision procedure to provide the user consent data, which may be specific for each service or client application type, and for which the user consent data has been configured. Similarly, a user consent revocation (to include deletion) or update notification can be triggered by a UE when any of the user consent data changes from its previous state and/or is updated. As referred to herein, a CAPIF function can be any function in the CAPIF framework (i.e., CAPIF Core Function (CCF), API Exposing Function (AEF), a resource-owner registration function, or any function that belongs to CAPIF).

A resource owner (e.g., a user or UE) can be authenticated and authorized to access or register with a CAPIF function to enable real-time user consent driven API invocation authorization and secured user service data exposure by the network. In one or more implementations, security credentials or context for the resource owner and CAPIF function are generated and used to enable the CAPIF to support authentication of the resource owner. Additionally or alternatively, a temporary user identity (e.g., a CAPIF-UE identifier (ID), a generic public subscription identifier (GPSI), or a resource owner ID) can be used to ensure or preserve confidentiality of the external identity of the UE (e.g., the mobile subscriber integrated services digital network number (MSISDN)) of the UE during the API invocation supported by CAPIF. Additionally or alternatively, the resource owner registers with the CAPIF, allowing the resource owner to manage and control user related service data exposure to user applications or to application servers and/or functions (which may belong to a third party) that offer service to the user applications (e.g., application clients). By performing one or a combination of these techniques, the resource owner is able to be authenticated and securely authorize user data related to the resource owner being exposed to any user related services, such as in response to an invoked API.

Some implementations of the method and apparatuses described herein may include an apparatus (e.g., a UE), which transmits information, such as to a CAPIF function or to a core network function (CNF) (i.e., unified data management (UDM), a unified data repository (UDR), an unstructured data storage function (UDSF), or any other network function via an access and mobility management function (AMF) in any non-access stratum message), to trigger a user consent provisioning procedure, such as for one or more applications installed on the apparatus. The UE also transmits a data exposure notification comprising at least user consent data, and the UE receives a data exposure response acknowledgement (ACK) that indicates the user consent data is stored for reference of the user consent.

In some implementations of the method and apparatuses described herein, the user consent data is stored local to the CAPIF, or can be stored on network storage by a network storage function. The UE transmits the information as a resource owner data notification trigger, transmitted to the CAPIF of a network after the UE is registered to the network. Alternatively, the resource owner data notification trigger is transmitted to a CNF of the network, bypassing other core network functions and/or the CAPIF of the network. The UE transmits the data exposure notification as a resource owner data exposure notification comprising a UE identifier, a resource owner identifier, and/or the user consent data. The UE is implemented to form a key derivation function (KDF) input for key generation, where the key includes a shared key (i.e., based on CAPIF Key or resource owner key) and the input includes a resource owner identifier, a UE identifier, a refresh parameter, an application identifier, an application function identifier, an application server identifier, and/or a CAPIF function identifier. The UE is implemented to establish a secure session with the CAPIF function using a shared key derived from a CAPIF key. The information transmitted by the UE includes a refresh parameter to generate a new key from the shared key for the secure session. The refresh parameter can be a counter incremented for each new key generated from a previous shared key for the secure session. The UE can transmit a resource owner data exposure update notification that includes a UE identifier, a resource owner identifier, and/or updated user consent data. The UE can transmit a resource owner data exposure revoke notification indicating to revoke the user consent. The UE can transmit a resource owner data exposure delete notification indicating to delete the user consent data.

Some implementations of the method and apparatuses described herein may include an apparatus (e.g., a network device that implements a CAPIF function or CNF), which receives, from a UE, information to trigger a user consent provisioning procedure. The network device also receives a resource owner data exposure notification comprising at least user consent data, and stores the user consent data local to the CAPIF, or on network storage by a network storage function. The network device transmits, to the UE, a data exposure response ACK that indicates the user consent data is stored for reference of the user consent.

In some implementations of the method and apparatuses described herein, the network device that implements the CAPIF function or CNF establishes a secure session with the UE using a shared key derived from a CAPIF key. The information includes a refresh parameter, which includes one or more of a counter, a nonce, or random number to generate a new key from the shared key for the secure session. The network device can obtain UE identifying data that is stored locally, utilize the UE identifying data and the refresh parameter as input for key generation of the new key to establish the secure session between the UE and the CAPIF function, and form a key derivation function input for key generation, the input comprising one or more of: a resource owner identifier, a user equipment identifier, a refresh parameter, an application identifier, an application programming interface exposing function identifier, or a common application programming interface framework function identifier. The network device can receive a resource owner data exposure update notification that includes a UE identifier, a resource owner identifier, and/or updated user consent data. The network device can receive a resource owner data exposure revoke notification indicating to revoke the user consent. The network device can receive a resource owner data exposure delete notification indicating to delete the user consent data.

BRIEF DESCRIPTION OF THE DRAWINGS

Various aspects of the present disclosure for secure user consent data notification are described with reference to the following Figures. The same numbers may be used throughout to reference like features and components shown in the Figures.

DETAILED DESCRIPTION

Implementations of secure user consent data notification are described, such as for a user equipment (UE) (resource owner or user) that can provide, update, and revoke user consent data to a CAPIF function or CNF in a real-time and secured manner. The resource owner can securely provide user consent data to the CAPIF function based on a key derived from CAPIF security context. After registration to the network, or after resource owner registration to the CAPIF, the UE can trigger the user consent provision procedure to provide the user consent data, which may be specific for each service or client application type, and for which the user consent data has been configured. Similarly, a user consent revocation (to include deletion) or update notification can be triggered by a UE when any of the user consent data changes from its previous state and/or is updated. As referred to herein, a CAPIF function can be any function in the CAPIF framework (i.e., CAPIF Core Function (CCF), API Exposing Function (AEF), a resource-owner registration function, or any function that belongs to CAPIF).

Currently, the 5G system only supports static user consent handling in the unified data management (UDM) and/or unified data repository (UDR) as part of subscription data. Given that a UE (resource owner) may accept or revoke data sharing for applications based on preference and at any time, the existing static approach to user consent data handling is no applicable for real-time applications or for user data exposure control, which may impact both user privacy and user application experience. In aspects, the API exposing function (AEF) may be implemented to trigger user consent collection upon service API invocation, but the existing procedure does not define how a user consent data is collected in a secure manner. This lack of sufficient user consent data collection security can lead to comprise of user consent data (i.e., when a user denies to share data, an attacker can modify the consent data to appear as data exposure allowed by the user), which may lead to user privacy corruption.

Aspects of the present disclosure are described in the context of a wireless communications system. Aspects of the present disclosure are further illustrated and described with reference to device diagrams and flowcharts that relate to secure user consent data notification.

Figure 1:
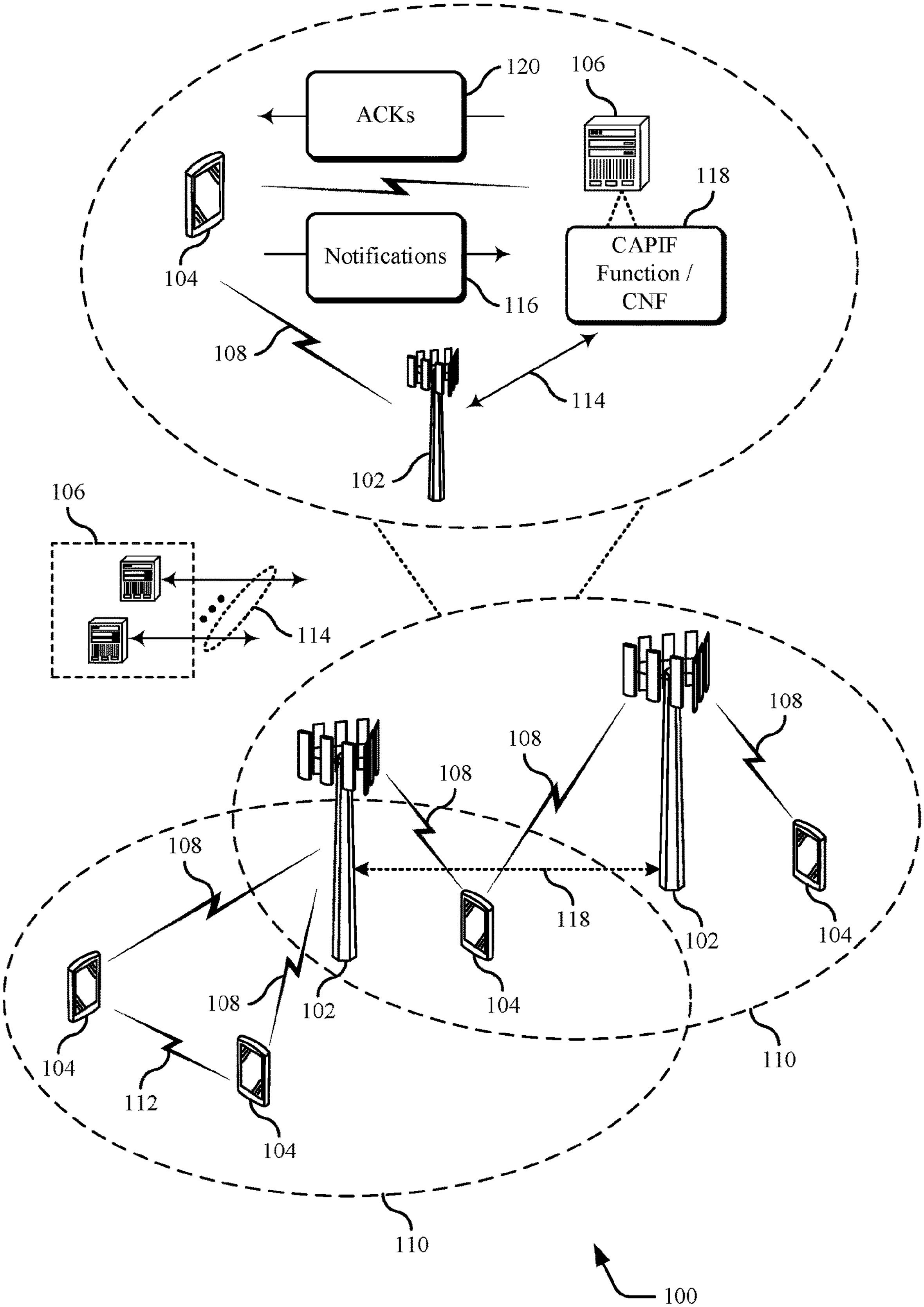
FIG. 1 illustrates an example of a wireless communications system that supports secure user consent data notification in accordance with aspects of the present disclosure.

FIG. 1 illustrates an example of a wireless communications system 100 that supports secure user consent data notification in accordance with aspects of the present disclosure. The wireless communications system 100 may include one or more base stations 102, one or more UEs 104, and a core network 106. The wireless communications system 100 may support various radio access technologies. In some implementations, the wireless communications system 100 may be a 4G network, such as an LTE network or an LTE-Advanced (LTE-A) network. In some other implementations, the wireless communications system 100 may be a 5G network, such as a NR network. In other implementations, the wireless communications system 100 may be a combination of a 4G network and a 5G network. The wireless communications system 100 may support radio access technologies beyond 5G. Additionally, the wireless communications system 100 may support technologies, such as time division multiple access (TDMA), frequency division multiple access (FDMA), or code division multiple access (CDMA), etc.

The one or more base stations 102 may be dispersed throughout a geographic region to form the wireless communications system 100. One or more of the base stations 102 described herein may be, or include, or may be referred to as a base transceiver station, an access point, a NodeB, an eNodeB (eNB), a next-generation NodeB (gNB), a Radio Head (RH), a relay node, an integrated access and backhaul (IAB) node, or other suitable terminology. A base station 102 and a UE 104 may communicate via a communication link 108, which may be a wireless or wired connection. For example, a base station 102 and a UE 104 may perform wireless communication over a NR-Uu interface.

A base station 102 may provide a geographic coverage area 110 for which the base station 102 may support services (e.g., voice, video, packet data, messaging, broadcast, etc.) for one or more UEs 104 within the geographic coverage area. For example, a base station 102 and a UE 104 may support wireless communication of signals related to services (e.g., voice, video, packet data, messaging, broadcast, etc.) according to one or multiple radio access technologies. In some implementations, a base station 102 may be moveable, such as when implemented as a gNB onboard a satellite or other non-terrestrial station (NTS) associated with a non-terrestrial network (NTN). In some implementations, different geographic coverage areas 110 associated with the same or different radio access technologies may overlap, and different geographic coverage areas 110 may be associated with different base stations 102. Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The one or more UEs 104 may be dispersed throughout a geographic region or coverage area 110 of the wireless communications system 100. A UE 104 may include or may be referred to as a mobile device, a wireless device, a remote device, a handheld device, a customer premise equipment (CPE), a subscriber device, or as some other suitable terminology. In some implementations, the UE 104 may be referred to as a unit, a station, a terminal, or a client, among other examples. Additionally, or alternatively, a UE 104 may be referred to as an Internet-of-Things (IoT) device, an Internet-of-Everything (IoE) device, or as a machine-type communication (MTC) device, among other examples. In some implementations, a UE 104 may be stationary in the wireless communications system 100. In other implementations, a UE 104 may be mobile in the wireless communications system 100, such as an earth station in motion (ESIM).

The one or more UEs 104 may be devices in different forms or having different capabilities. Some examples of UEs 104 are illustrated in FIG. 1. A UE 104 may be capable of communicating with various types of devices, such as the base stations 102, other UEs 104, or network equipment (e.g., the core network 106, a relay device, a gateway device, an integrated access and backhaul (IAB) node, a location server that implements the location management function (LMF), or other network equipment). Additionally, or alternatively, a UE 104 may support communication with other base stations 102 or UEs 104, which may act as relays in the wireless communications system 100.

A UE 104 may also support wireless communication directly with other UEs 104 over a communication link 112. For example, a UE 104 may support wireless communication directly with another UE 104 over a device-to-device (D2D) communication link. In some implementations, such as vehicle-to-vehicle (V2V) deployments, vehicle-to-everything (V2X) deployments, or cellular-V2X deployments, the communication link 112 may be referred to as a sidelink. For example, a UE 104 may support wireless communication directly with another UE 104 over a PC5 interface.

A base station 102 may support communications with the core network 106, or with another base station 102, or both. For example, a base station 102 may interface with the core network 106 through one or more backhaul links 114 (e.g., via an S1, N2, or other network interface). The base stations 102 may communicate with each other over the backhaul links 118 (e.g., via an X2, Xn, or another network interface). In some implementations, the base stations 102 may communicate with each other directly (e.g., between the base stations 102). In some other implementations, the base stations 102 may communicate with each other indirectly (e.g., via the core network 106). In some implementations, one or more base stations 102 may include subcomponents, such as an access network entity, which may be an example of an access node controller (ANC). The ANC may communicate with the one or more UEs 104 through one or more other access network transmission entities, which may be referred to as remote radio heads, smart radio heads, gateways, transmission-reception points (TRPs), and other network nodes and/or entities.

The core network 106 may support user authentication, access authorization, tracking, connectivity, and other access, routing, or mobility functions. The core network 106 may be an evolved packet core (EPC), or a 5G core (5GC), which may include a control plane entity that manages access and mobility (e.g., a mobility management entity (MME), an access and mobility management functions (AMF)), and a user plane entity that routes packets or interconnects to external networks (e.g., a serving gateway (S-GW), a Packet Data Network (PDN) gateway (P-GW), or a user plane function (UPF)). In some implementations, the control plane entity may manage non-access stratum (NAS) functions, such as mobility, authentication, and bearer management for the one or more UEs 104 served by the one or more base stations 102 associated with the core network 106.

According to implementations, one or more of the UEs 104 and core network 106 devices (i.e., implementing the network functions) are operable to implement various aspects of secure user consent data notification, as described herein. For instance, a UE 104 can transmit information, as notifications 116, to a CAPIF function or CNF 118, to trigger a user consent provisioning procedure, such as for one or more applications installed on the UE. The UE 104 also transmits a data exposure notification 116 comprising at least user consent data, and the UE receives a data exposure response ACK 120 that indicates the user consent data is stored for reference of the user consent. Similarly, a network device 106 that implements the CAPIF function or CNF 118 receives, from the UE 104, the information as a notification 116 to trigger a user consent provisioning procedure. The network device 106 also receives a resource owner data exposure notification 116 comprising at least user consent data, and stores the user consent data local to the CAPIF 118, or on network storage by a network storage function. The network device 106 transmits, to the UE 104, a data exposure response ACK 120 that indicates the user consent data is stored for reference of the user consent. In an alternative implementation, the UE 104 can also transmit a notification 116 via communication links 108 and a base station 102, to the CNF 118. A notification from the UE 104 can be transmitted to the CNF (e.g., UDM, UDR, UDSF) via another CNF (e.g., API management function (AMF)) in any NAS message. The UE can send a NAS message to the AMF, and the message is carried by radio access network (RAN).

Figure 2:
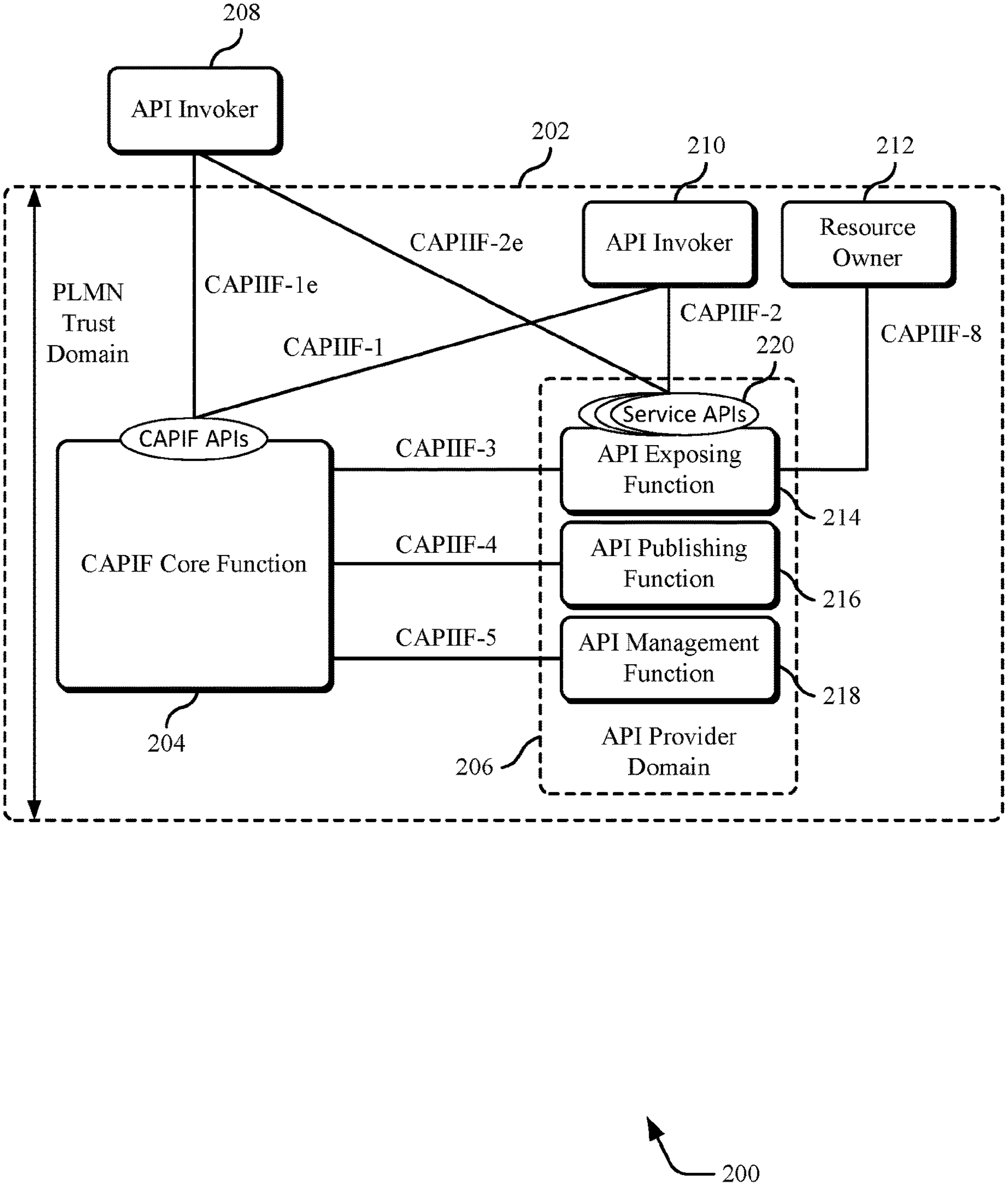
FIG. 2 illustrates an example of a CAPIF system as related to secure user consent data notification in accordance with aspects of the present disclosure.

FIG. 2 illustrates an example of a CAPIF system 200 as related to secure user consent data notification in accordance with aspects of the present disclosure. The CAPIF system 200 may use the wireless communications system 100 and/or be implemented with the wireless communications system. The CAPIF system 200 provides a unified bound API framework across multiple 3$^{rd}$ Generation Partnership Project (3GPP) functions. The CAPIF system 200 hosts APIs of a public land mobile network (PLMN) trust domain 202 and allows third parties to leverage the CAPIF framework to host their APIs.

The CAPIF system 200 includes a CAPIF core function (CCF) 204, an API provider domain 206, one or more API invokers 208 and 210, and a resource owner 212. The resource owner 212 is, for example, a user or a UE. An API invoker can be external to the PLMN trust domain 202 (e.g., API invoker 208) or internal to the PLMN trust domain 202 (e.g., API invoker 210). Each API invoker 208 is an entity (e.g., an application) that requests service from the service providers via the service APIs 220.

The CCF 204 includes one or more capabilities, including: Authenticating the API invoker based on the identity and other information required for authentication of the API invoker; Supporting mutual authentication with the API invoker; Providing authorization for the API invoker prior to accessing the service API; Publishing, storing and supporting the discovery of service APIs information; Controlling the service API access based on PLMN operator configured policies; Storing the logs for the service API invocations and providing the service API invocation logs to authorized entities; Charging based on the logs of the service API invocations; Monitoring the service API invocations; Onboarding a new API invoker and offboarding an API invoker; Storing policy configurations related to CAPIF and service APIs; Supports accessing the logs for auditing (e.g. detecting abuse); Supports publishing, discovery of service APIs information with another CAPIF core function in CAPIF interconnection; and Supports resource owner registration using any new CAPIF interface.

The API provider domain 206 includes an AEF 214, an API publishing function 216, and an API management function 218. The AEF 214 is the provider of the service APIs 220 and is also the service communication entry point of the service APIs 220 to the API invokers 208 and 210. The API exposing function includes one or more of the following capabilities: authenticating the API invoker based on the identity and other information required for authentication of the API invoker provided by the CAPIF core function; validating the authorization provided by the CAPIF core function; logging the service API invocations at the CAPIF core function; supports resource owner registration using any new CAPIF interface; and supports user consent handling with the resource owner and a related core network function.

The API publishing function 216 enables the API provider to publish the service APIs information in order to enable the discovery of service APIs by the API invoker. The API publishing function includes the capability of publishing the service CAPIF information of the CAPIF provider to the CAPIF core function. The API management function 218 enables the API provider to perform administration of the service APIs. The API management function includes one or more of the following capabilities: auditing the service API invocation logs received from the CAPIF core function; monitoring the events reported by the CAPIF core function; configuring the CAPIF provider policies to the CAPIF core function; monitoring the status of the service APIs; onboarding the new API invokers and offboarding API invokers; and registering and maintaining registration information of the API provider domain functions on the CAPIF core function.

The CAPIF system 200 includes multiple reference points, each reference point indicating interactions between two CAPIF functions. These reference points include CAPIF-1, CAPIF-le, CAPIF-2, CAPIF-2e, CAPIF-3, CAPIF-4, CAPIF-5, and CAPIF-8 as illustrated in the example. The CAPIF-1 reference point, which exists between the API invoker 210 and the CCF 204, is used for the API invoker 210 within the PLMN trust domain 202 to discover service APIs 220, to authenticate and to get authorization. The CAPIF-1 reference point supports: authenticating the API invoker 210 based on the identity and credentials of the API invoker 210; mutual authentication between the API invoker 210 and the CCF 204; providing authorization for the API invoker 210 prior to accessing the service API 220; and discovering the service APIs 220 information.

The CAPIF-1e reference point, which exists between the API invoker 208 and the CCF 204, is used for the API invoker 208 outside the PLMN trust domain 202 to discover service APIs 220, to authenticate and to get authorization. The CAPIF-le reference point supports all the functions of the CAPIF-1 reference point, although for the API invoker 208 rather than the API invoker 210. The CAPIF-2 reference point, which exists between the API invoker 210 and the AEF 214 belonging to the same trust domain, is used for the API invoker 210 to communicate with the service APIs 220. The CAPIF-2 reference point supports: authenticating the API invoker 210 based on the identity and credentials of the API invoker 210; authorization verification for the API invoker 210 upon accessing the service API; and invocation of service APIs 220.

The CAPIF-2e reference point, which exists between the API invoker 208 and the AEF 214 belonging to a different trust domain, is used for the API invoker 208 to communicate with the service APIs 220. The CAPIF-2e reference point supports all the functions of CAPIF-2 reference point 226, although for the API invoker 208 rather than the API invoker 210. The CAPIF-3 reference point, which exists between the AEF 214 and the CCF 204, is used for exercising access and policy related control for service API communications initiated by the API invoker (e.g., the API invoker 208 or the API invoker 210). The CAPIF-3 reference point supports: authenticating the API invoker based on the identity and credentials of the API invoker; providing authorization for the API invoker prior to accessing the service API; authorization verification for the API invoker upon accessing the service API 220; controlling the service API 220 access based on PLMN operator configured policies; logging the service API 220 invocations; and charging the service API 220 invocations. The CAPIF-4 reference point, which exists between the API publishing function 216 and the CCF 204, is used for publishing the service API 220 information. The CAPIF-4 reference point supports publishing the service APIs 220 information by the API publishing function 216.

The CAPIF-5 reference point, which exists between the API management function 218 and the CCF, is used for management of service API 220, API invoker (e.g., the API invoker 208 or the API invoker 210) and API provider domain function information. The CAPIF-5 reference point supports: accessing the service API 220 invocation logs by the API management function 218; enabling the API management function 218 to monitor the events reported due to the service APIs 220 invocations; onboarding new API invokers by provisioning the API invoker information at the CCF, requesting explicit grant of new API invokers onboarding and confirming onboarding success; offboarding API invokers; enabling the API management function 218 to configure policies at the CCF e.g. service API invocation throttling, blocking API invocation for certain duration; enabling the API provider to monitor the status of service APIs 220 (e.g. pilot or live status, start or stop status of service API 220); registering API provider domain functions on the CCF; and update of the registration information of API provider domain functions on the CCF.

The CAPIF-8 reference point, which exists between the resource owner 212 and the AEF 214, is used for allowing resource owner consent for accepting, providing, or exposing user related data (e.g., resource owner related data) to a service API 220. The CAPIF-8 reference point supports: generating CAPIF keys for the resource owner 212 CAPIF authentication and authorization; registering the resource owner 212 for CAPIF authentication and authorization; and performing user consent collection upon API invocation.

Figure 3:
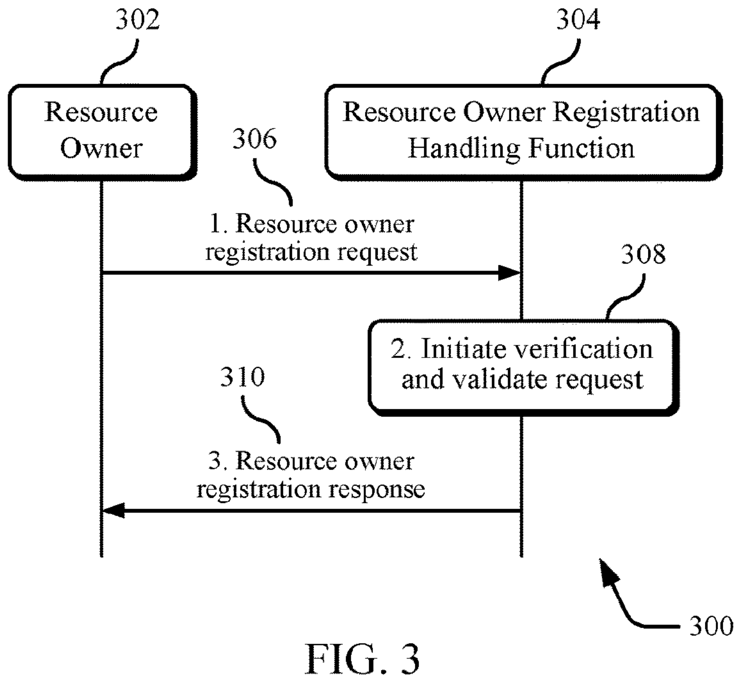
FIG. 3 illustrates an example resource owner registration procedure as related to secure user consent data notification in accordance with aspects of the present disclosure.

FIG. 3 illustrates an example resource owner registration procedure 300 as related to secure user consent data notification in accordance with aspects of the present disclosure. The procedure 300 illustrates, for example, resource owner registration for CAPIF. The procedure 300 illustrates interaction between a resource owner 302 and a resource owner registration handling function 304. In one or more implementations, the resource owner registration handling function 304 is included in the core network 106 of FIG. 1.

At 306, the resource owner 302 sends (e.g., transmits), to the resource owner registration handling function 304, a resource owner registration request with a UE ID (e.g., a GPSI). At 308, the resource owner registration handling function 304 checks whether a CAPIF security context is locally available for the UE ID. At 310, the resource owner registration handling function 304 sends (e.g., transmits), to the resource owner, a resource owner registration response. The response indicates that the resource owner 302 is registered for CAPIF if a CAPIF security context is locally available for the UE ID, and that the resource owner is not registered for CAPIF if a CAPIF security context is not locally available for the UE ID. In one or more implementations, the techniques discussed herein implement one or more portions of the procedure 300.

Figure 4:
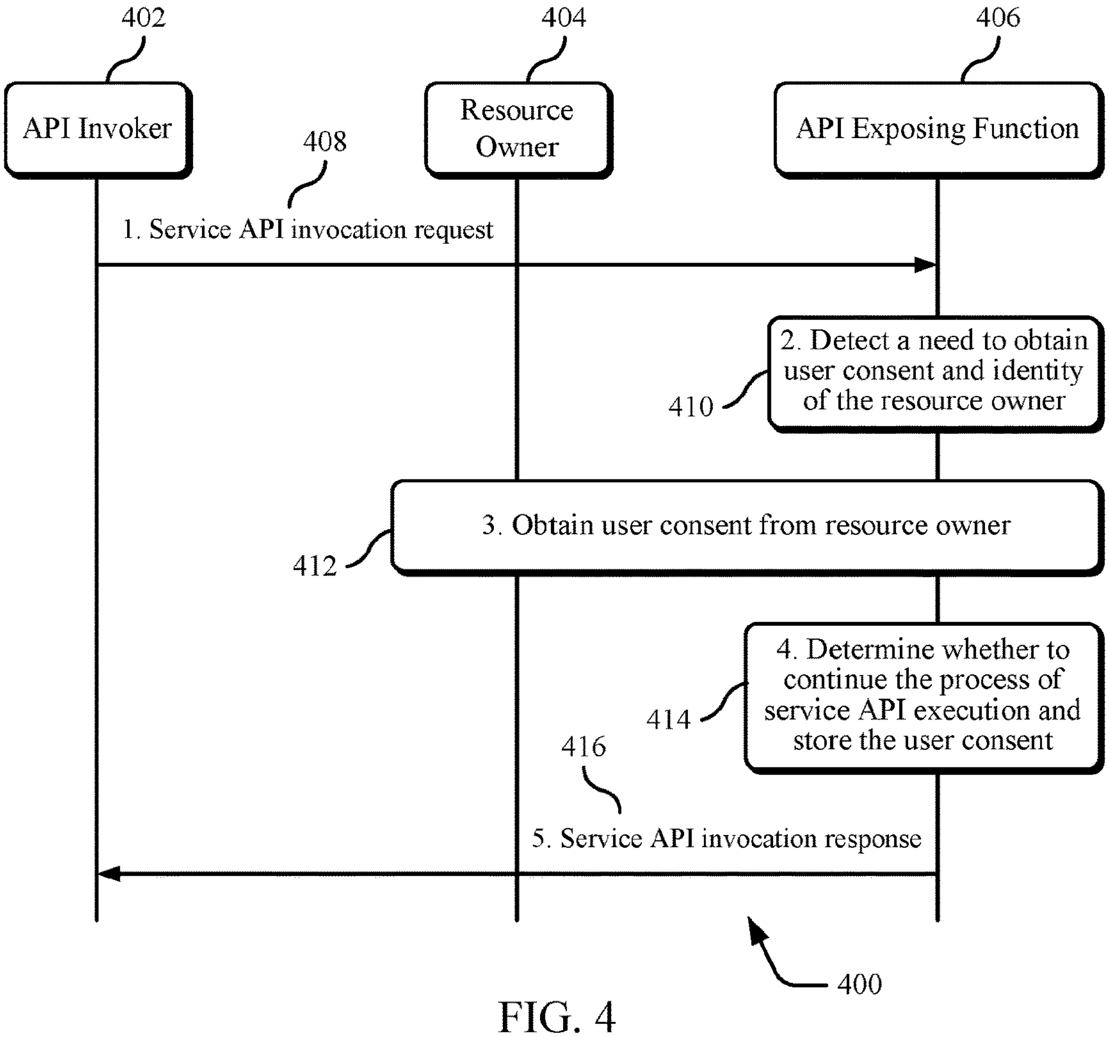
FIG. 4 illustrates an example consent procedure as related to secure user consent data notification in accordance with aspects of the present disclosure.

FIG. 4 illustrates an example consent procedure 400 as related to secure user consent data notification in accordance with aspects of the present disclosure. The procedure 400 illustrates, for example, obtaining user consent for CAPIF. The procedure 400 illustrates interaction between various ones of an API invoker 402, a resource owner 404, and an AEF 406. In one or more implementations, the AEF 406 is included in the core network 106 of FIG. 1.

At 408, the API invoker 402 sends a service API invocation request to the AEF 406, which requires user consent of the resource owner. At 410, the AEF 406 determines if resource owner consent is required to execute the service API. If the user consent is not required for the API invocation, the actions at 412 and 414 are skipped. At 412, the AEF 406 communicates with the resource owner 404 to obtain consent from the resource owner 404 for the API invoker 402 to invoke the API. At 414, if the API invocation is allowed, the process for service API execution is continued. If the API invocation is denied, the service API execution is rejected. The result of the user consent response is stored in the API exposing function. At 416, the API exposing function sends a service API invocation response to the API invoker based on the result of the service API execution. In one or more implementations, the techniques discussed herein implement one or more portions of the procedure 400.

In aspects of secure user consent data notification, a UE (resource owner or user) can provide, update, and revoke user consent data to a CAPIF function or CNF in a real-time and secured manner. The resource owner can securely provide user consent data to the CAPIF function based on a key derived from CAPIF security context (i.e., KCAPIF Or KCAPIF-Reg). After registration to the network, the UE can trigger the user consent provision procedure to provide the user consent data that is specific to each service type (e.g., location, ranging, velocity, speed, etc.) for a target application client, server, function, and/or servers for which the user consent data has been configured in the UE, and which can influence the UE application service data. Similarly, a user consent revocation (to include deletion) or update notification can be triggered by the resource owner when any of the user consent data changes from its previous state and/or is updated. As referred to herein, a CAPIF function can be any function in the CAPIF framework (i.e., CAPIF Core Function (CCF), API Exposing Function (AEF), a resource-owner registration function, or any function that belongs to CAPIF).

Figure 5:
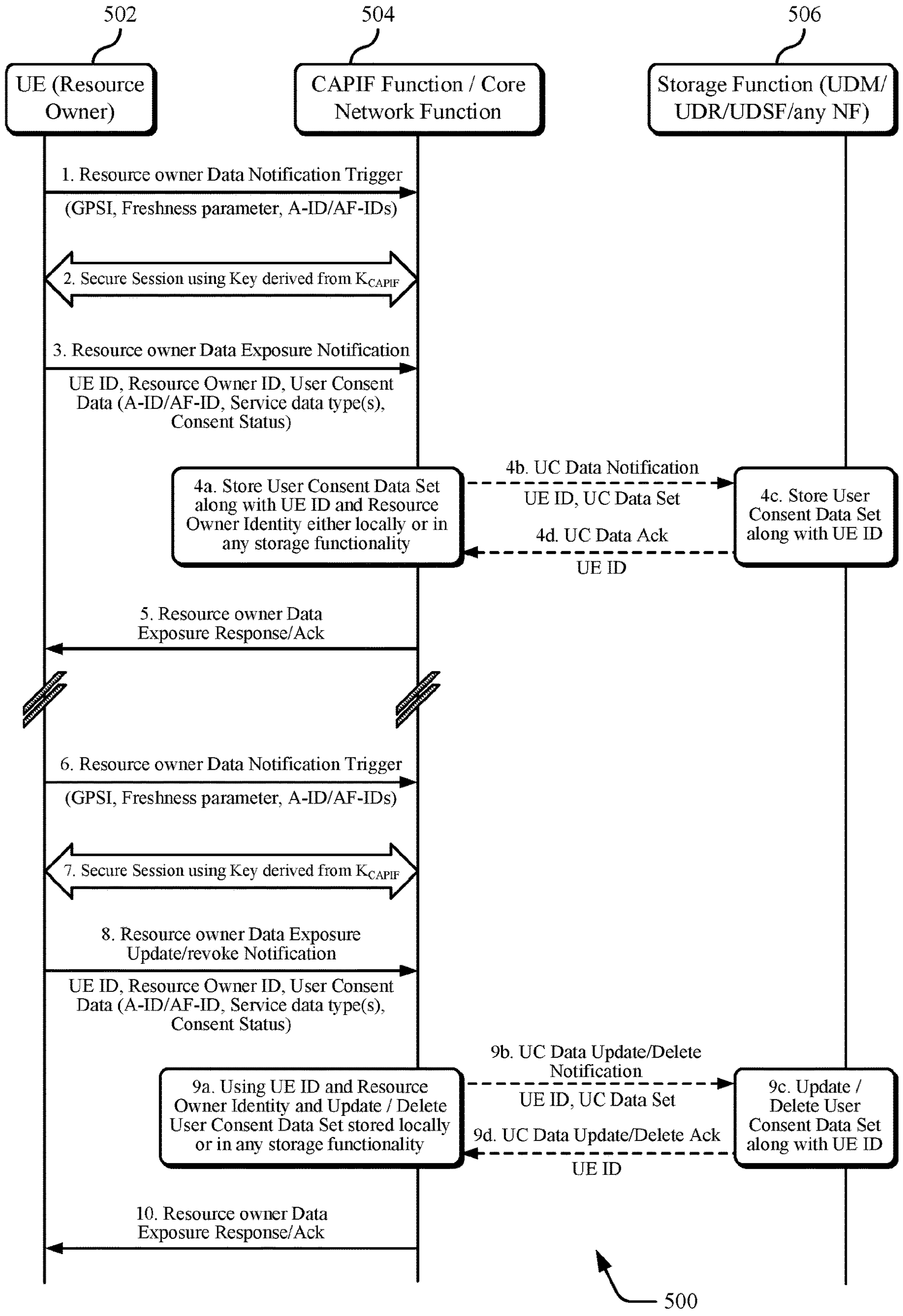
FIG. 5 illustrates example procedures for UE triggered user consent collection and revocation that supports secure user consent data notification in accordance with aspects of the present disclosure.

FIG. 5 illustrates an example 500 of procedures for UE triggered user consent collection and revocation that supports secure user consent data notification in accordance with aspects of the present disclosure. In this example 500, a UE 502 is a resource owner that communicates (e.g., transmits and receives) with a network device that implements a CAPIF function 504 (or CNF). The CAPIF function 504 may communicate (e.g., transmit and receive) with a storage function 506 of a network storage. The storage function 506 may be implemented as unified data management (UDM), a unified data repository (UDR), an unstructured data storage function (UDSF), or as any type of other network function. In this example 500, the procedure steps 1-5 are directed to the user consent data provisioning procedure, and steps 6-10 are directed to the user consent data update, revocation, and/or deletion procedure.

With reference to the user consent data provisioning procedure, at procedure step 1, the UE transmits information to the CAPIF function (i.e., using a CAPIF interface) or CNF (i.e., using a NAS message transport) to trigger the user consent provisioning procedure. The resource owner generates a $K_{CAPIF\text{-}User}$ from $K_{CAPIF}$ or $K_{CAPIF\text{-}Reg}$. When deriving the $K_{CAPIF\text{-}RO}$ (alternatively termed as $K_{CAPIF\text{-}User}$) from $K_{CAPIF}$ or $K_{CAPIF\text{-}Reg}$, one or more of the following parameters can be used to form the input S to the key derivation function (KDF): FC=xxxx; parameter P0 is a "resource owner ID" and L0 is the length of the "resource Owner ID". Parameter P1 is a UE ID (i.e., generic public subscription identifier (GPSI) or subscription permanent identifier (SUPI)) and L1 is the length of the UE ID (i.e., GPSI/SUPI). Parameter P2 is a "freshness parameter" (i.e., a counter, random number, or nonce) and L2 is the length of the "freshness parameter". Parameter P3 is application ID(s) or application function ID(s) and L3 is the length of the application ID(s) or application function ID(s). Parameter P4 is a CAPIF function ID or AEF ID and L4 is the length of the CAPIF function ID or AEF ID.

The input KEY can be $K_{CAPIF}$ or $K_{CAPIF\text{-}Reg}$. In an implementation, a counter can be used as freshness parameter (also referred to herein as a "refresh parameter"), and the counter is incremented before every new $K_{CAPIF\text{-}RO}$ (alternatively can be termed as $K_{CAPIF\text{-}User}$) generation happens from $K_{CAPIF}$ Or $K_{CAPIF\text{-}Reg}$. For the initial key generation, the counter is set as 0/1. The resource owner (RO) transmits the resource owner data notification trigger, which can include GPSI, the freshness parameter, and application, client, server, function, and/or servers identifiers for which the data trigger is related or required (i.e., for which the user consent data is to be provided).

At procedure step 2, a secure session between the UE and CAPIF function is established using a shared key derived from a CAPIF key. The CAPIF function receives the resource owner data trigger, and obtains (e.g., fetches) the UE or resource owner data that is locally stored, as related to the UE ID (GPSI). Further the CAPIF function derives the $K_{CAPIF\text{-}RO}$ (alternatively termed as $K_{CAPIF\text{-}User}$) from $K_{CAPIF}$ Or $K_{CAPIF\text{-}Reg}$ using the input parameters received at procedure step 1, similar to the resource owner. Further the CAPIF function and the resource owner authenticates and establishes a secure session and connection set-up based on $K_{CAPIF\text{-}RO}$ as the pre-shared key (i.e., TLS-PSK).

At procedure step 3, the UE transmits a data exposure notification that includes at least the user consent data to the CAPIF function or CNF. The resource owner can send the CAPIF Function the resource owner data exposure notification message, which can include a UE ID (GPSI/SUPI), a resource owner ID (i.e., an ID related to the resource owner registration), a user consent data set (A-ID/AF-ID, service data type(s), and consent status (accept/update)).

At procedure step 4, the CAPIF function can initiate to store the user consent data local to the CAPIF, or on network storage by a network storage function. At procedure step 4*a*, the CAPIF function can store or update the received user consent data set either locally, or can store the received user consent data set in the UDM/UDR/UDSF (or in any storage functionality) by forwarding the received message based on SUPI locally available in the CAPIF security context. At procedure step 4*b*, and based on configuration or implementation, the CAPIF function may send a storage function (UDM/UDR/UDSF or any storage functionality in the core network), a UC data notification (i.e., UC data storage request) which can include UE ID (SUPI/GPSI) and the UC data set received from the resource owner (UE). At procedure step 4*c*, the storage function can store the received UC data set along with the UE context and UE ID (SUPI/GPSI). At procedure step 4*d*, the storage function can send to the CAPIF function, a UC data acknowledgement (i.e., UC data storage response) which can include UE ID (SUPI/GPSI) and a success indication, where the UC implies a user consent.

At procedure step 5, the UE receives a data exposure response acknowledgement that indicates the user consent data is stored for reference of the user consent. The CAPIF function can send a success or similar ACK to the resource owner in a resource owner data exposure response message.

With reference to the user consent data update, revocation, and/or deletion procedure, at procedure steps 6 and 7, the process can be the same as for the respective procedure steps 1 and 2 described above. In an implementation in which a counter is used as the freshness parameter (e.g., "refresh" parameter), the counter can be incremented before every new $K_{CAPIF\text{-}RO}$ (alternatively termed as $K_{CAPIF\text{-}User}$) generation that occurs from $K_{CAPIF}$ or $K_{CAPIF\text{-}Reg}$.

At procedure step 8, the resource owner can send (e.g., transmit, communicate), a resource owner data exposure update or revoke notification message to the CAPIF function, and the update or revoke notification can include a UE ID, a resource owner ID, a user consent data set (A-ID/AF-ID, service data type(s), and consent status (update/revoke)).

At procedure step 9*a*, the CAPIF function can receive an update indication and update the received user consent data set that is either stored locally or on a network storage associated with the UDM, UDR, UDSF, or any other storage function, by forwarding the received message based on SUPI locally available in the CAPIF security context. Similarly, the CAPIF function may receive a revoke indication, and then revoke or delete the previously stored user consent data set that is stored locally. Alternatively, the CAPIF function can notify to delete in the UDM/UDR/UDSF by forwarding the received message based on SUPI locally available in the CAPIF security context.

At procedure step 9*b*, and based on a configuration or implementation, the CAPIF function may send (e.g., transmit, communicate), to a storage function (UDM/UDR/UDSF or any storage functionality in the core network), a UC data update, delete, revoke notification (i.e., as a UC data storage request), which can include a UE ID (SUPI/GPSI) and a UC data set if received from the resource owner (e.g., UE). At procedure step 9*c*, the storage function can store, update, delete, or revoke the stored UC data set related to the UE context, UE ID (SUPI/GPSI), and UC data set (if received) based on the received update, delete, or revocation notification, respectively. At procedure step 9*d*, the storage function can send the CAPIF function a UC data update, delete, or revocation ACK (i.e., a UC data storage response), which can include a UE ID (SUPI/GPSI) and a success indication. Based on local policy and/or an operator's policy and UE de-registration from the network, the storage function can delete and/or revoke the user consent data that is locally stored. At procedure step 10, the CAPIF function can send (e.g., transmit, communicate) a success acknowledgement to the resource owner in a resource owner data exposure response message.

In an alternate implementation, the user consent provision, update, or revocation can be performed using a control plane procedure (e.g., in a UE triggered UE parameter update procedure). After the UE sets up NAS security context with the network, the UE can perform a user consent, provision, update, or revocation procedure, where the procedure steps 3, 4, and 5 can be exchanged between the UE and an access and mobility management function (AMF) over any NAS message or NAS transport (using N1 interface, which carries NAS messages sent via RAN). Further, the AMF can forward to a storage functionality as in procedure steps 4*b*-4*d* (for example, UDM, UDR, UDSF, or any other functionality) to provision user consent data. Similarly the procedure steps 8, 9, and 10 can be exchanged between the UE and AMF (i.e., AMF can further forward to a storage functionality as in procedure steps 9*b*-9*d* (for example, UDM, UDR, UDSF, or any other functionality) to update, revoke, and/or delete the user consent data.

Figure 6:
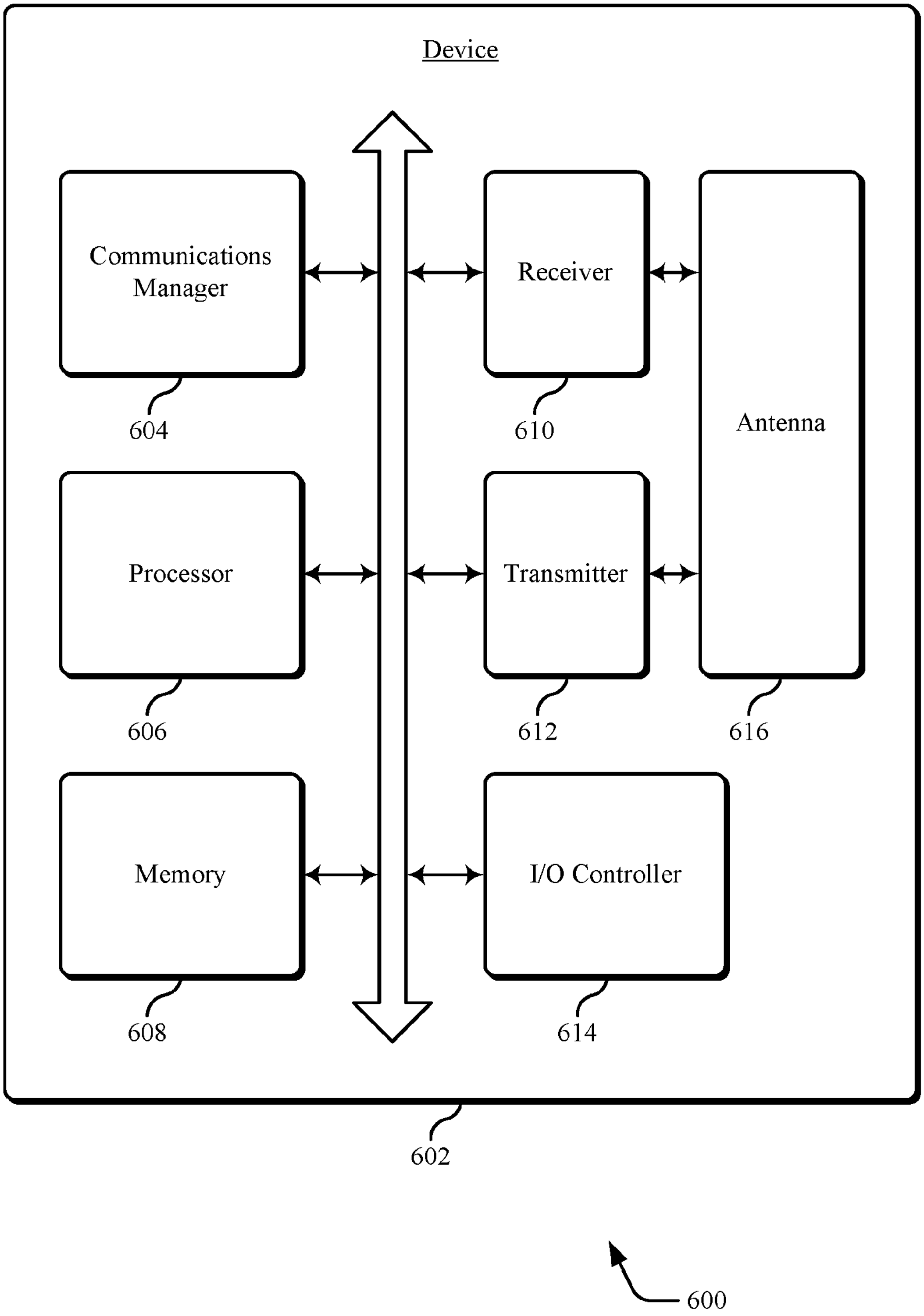
FIG. 6 illustrates an example block diagram of components of a device (e.g., a UE) that supports secure user consent data notification in accordance with aspects of the present disclosure.

FIG. 6 illustrates an example of a block diagram 600 of a device 602 that supports secure user consent data notification in accordance with aspects of the present disclosure. The device 602 may be an example of a UE 104 as described herein. The device 602 may support wireless communication and/or network signaling with one or more base stations 102, other UEs 104, core network devices and functions (e.g., core network 106), or any combination thereof. The device 602 may include components for bi-directional communications including components for transmitting and receiving communications, such as a communications manager 604, a processor 606, a memory 608, a receiver 610, a transmitter 612, and an I/O controller 614. These components may be in electronic communication or otherwise coupled (e.g., operatively, communicatively, functionally, electronically, electrically) via one or more interfaces (e.g., buses).

The communications manager 604, the receiver 610, the transmitter 612, or various combinations thereof or various components thereof may be examples of means for performing various aspects of the present disclosure as described herein. For example, the communications manager 604, the receiver 610, the transmitter 612, or various combinations or components thereof may support a method for performing one or more of the functions described herein.

In some implementations, the communications manager 604, the receiver 610, the transmitter 612, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some implementations, the processor 606 and the memory 608 coupled with the processor 606 may be configured to perform one or more of the functions described herein (e.g., by executing, by the processor 606, instructions stored in the memory 608).

Additionally or alternatively, in some implementations, the communications manager 604, the receiver 610, the transmitter 612, or various combinations or components thereof may be implemented in code (e.g., as communications management software or firmware) executed by the processor 606. If implemented in code executed by the processor 606, the functions of the communications manager 604, the receiver 610, the transmitter 612, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some implementations, the communications manager 604 may be configured to perform various operations (e.g., receiving, monitoring, transmitting) using or otherwise in cooperation with the receiver 610, the transmitter 612, or both. For example, the communications manager 604 may receive information from the receiver 610, send information to the transmitter 612, or be integrated in combination with the receiver 610, the transmitter 612, or both to receive information, transmit information, or perform various other operations as described herein. Although the communications manager 604 is illustrated as a separate component, in some implementations, one or more functions described with reference to the communications manager 604 may be supported by or performed by the processor 606, the memory 608, or any combination thereof. For example, the memory 608 may store code, which may include instructions executable by the processor 606 to cause the device 602 to perform various aspects of the present disclosure as described herein, or the processor 606 and the memory 608 may be otherwise configured to perform or support such operations.

For example, the communications manager 604 may support wireless communication and/or network signaling at a device (e.g., the device 602, a UE) in accordance with examples as disclosed herein. The communications manager 604 and/or other device components may be configured as or otherwise support an apparatus, such as a UE, including a transceiver; a processor coupled to the transceiver, the processor and the transceiver configured to cause the apparatus to: transmit information to trigger a user consent provisioning procedure; transmit a data exposure notification comprising at least user consent data; and receive a data exposure response acknowledgement that indicates the user consent data is stored for reference of the user consent.

Additionally, the apparatus (e.g., a UE) includes any one or combination of: the user consent is for one or more applications installed on the apparatus. The user consent data is one of stored local to a common application programming interface framework, or stored on network storage by a network storage function. The information is a resource owner data notification trigger transmitted to a common application programming interface framework of a network after the user equipment is registered to the network. The information is a resource owner data notification trigger transmitted to a core network function of a network, bypassing one or more of another core network function or a common application programming interface framework of the network. The data exposure notification is a resource owner data exposure notification comprising at least one or more of a user equipment identifier, a resource owner identifier, or the user consent data. The processor is configured to form a key derivation function input for key generation, the input comprising one or more of: a resource owner identifier, a user equipment identifier, a refresh parameter, an application identifier, an application programming interface exposing function identifier, or a common application programming interface framework function identifier. The processor and the transceiver are configured to cause the apparatus to establish a secure session with a common application programming interface framework function using a shared key derived from a common application programming interface framework key. A refresh parameter includes one or more of a counter, a nonce, or random number to generate a new key from the shared key for the secure session. The refresh parameter is a counter incremented for each new key generated from a previous shared key for the secure session. The processor and the transceiver are configured to cause the apparatus to transmit a resource owner data exposure update notification comprising at least one or more of a user equipment identifier, a resource owner identifier, or updated user consent data. The processor and the transceiver are configured to cause the apparatus to transmit a resource owner data exposure revoke notification indicating to revoke the user consent. The processor and the transceiver are configured to cause the apparatus to transmit a resource owner data exposure delete notification indicating to delete the user consent data.

The communications manager 604 and/or other device components may be configured as or otherwise support a means for wireless communication and/or network signaling at a UE, including transmitting information to trigger a user consent provisioning procedure; transmitting a data exposure notification comprising at least user consent data; and receiving a data exposure response acknowledgement that indicates the user consent data is stored for reference of the user consent.

Additionally, network signaling at the UE includes any one or combination of: transmitting a resource owner data exposure update notification comprising at least one or more of a user equipment identifier, a resource owner identifier, or updated user consent data. The method further comprising transmitting a resource owner data exposure revoke notification indicating to revoke the user consent. The method further comprising transmitting a resource owner data exposure delete notification indicating to delete the user consent data. The method further comprising establishing a secure session with a common application programming interface framework function using a shared key derived from a common application programming interface framework key. A refresh parameter includes one or more of a counter, a nonce, or random number to generate a new key from the shared key for the secure session. The refresh parameter is a counter incremented for each new key generated from a previous shared key for the secure session. The method further comprising forming a key derivation function input for key generation, the input comprising one or more of: a resource owner identifier, a user equipment identifier, a refresh parameter, an application identifier, an application programming interface exposing function identifier, or a common application programming interface framework function identifier. The user consent is for one or more applications installed on the user equipment. The user consent data is one of stored local to a common application programming interface framework, or stored on network storage by a network storage function. The information is a resource owner data notification trigger transmitted to a common application programming interface framework of a network after the user equipment is registered to the network. The information is a resource owner data notification trigger transmitted to a core network function of a network, bypassing one or more of another core network function or a common application programming interface framework of the network. The data exposure notification is a resource owner data exposure notification comprising at least one or more of a user equipment identifier, a resource owner identifier, or the user consent data.

The processor 606 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some implementations, the processor 606 may be configured to operate a memory array using a memory controller. In some other implementations, a memory controller may be integrated into the processor 606. The processor 606 may be configured to execute computer-readable instructions stored in a memory (e.g., the memory 608) to cause the device 602 to perform various functions of the present disclosure.

The memory 608 may include random access memory (RAM) and read-only memory (ROM). The memory 608 may store computer-readable, computer-executable code including instructions that, when executed by the processor 606 cause the device 602 to perform various functions described herein. The code may be stored in a non-transitory computer-readable medium such as system memory or another type of memory. In some implementations, the code may not be directly executable by the processor 606 but may cause a computer (e.g., when compiled and executed) to perform functions described herein. In some implementations, the memory 608 may include, among other things, a basic I/O system (BIOS) which may control basic hardware or software operation such as the interaction with peripheral components or devices.

The I/O controller 614 may manage input and output signals for the device 602. The I/O controller 614 may also manage peripherals not integrated into the device 602. In some implementations, the I/O controller 614 may represent a physical connection or port to an external peripheral. In some implementations, the I/O controller 614 may utilize an operating system such as iOS®, ANDROID®, MS-DOS®, MS-WINDOWS®, OS/2®, UNIX®, LINUX®, or another known operating system. In some implementations, the I/O controller 614 may be implemented as part of a processor, such as the processor 606. In some implementations, a user may interact with the device 602 via the I/O controller 614 or via hardware components controlled by the I/O controller 614.

In some implementations, the device 602 may include a single antenna 616. However, in some other implementations, the device 602 may have more than one antenna 616, which may be capable of concurrently transmitting or receiving multiple wireless transmissions. The receiver 610 and the transmitter 612 may communicate bi-directionally, via the one or more antennas 616, wired, or wireless links as described herein. For example, the receiver 610 and the transmitter 612 may represent a wireless transceiver and may communicate bi-directionally with another wireless transceiver. The transceiver may also include a modem to modulate the packets, to provide the modulated packets to one or more antennas 616 for transmission, and to demodulate packets received from the one or more antennas 616.

Figure 7:
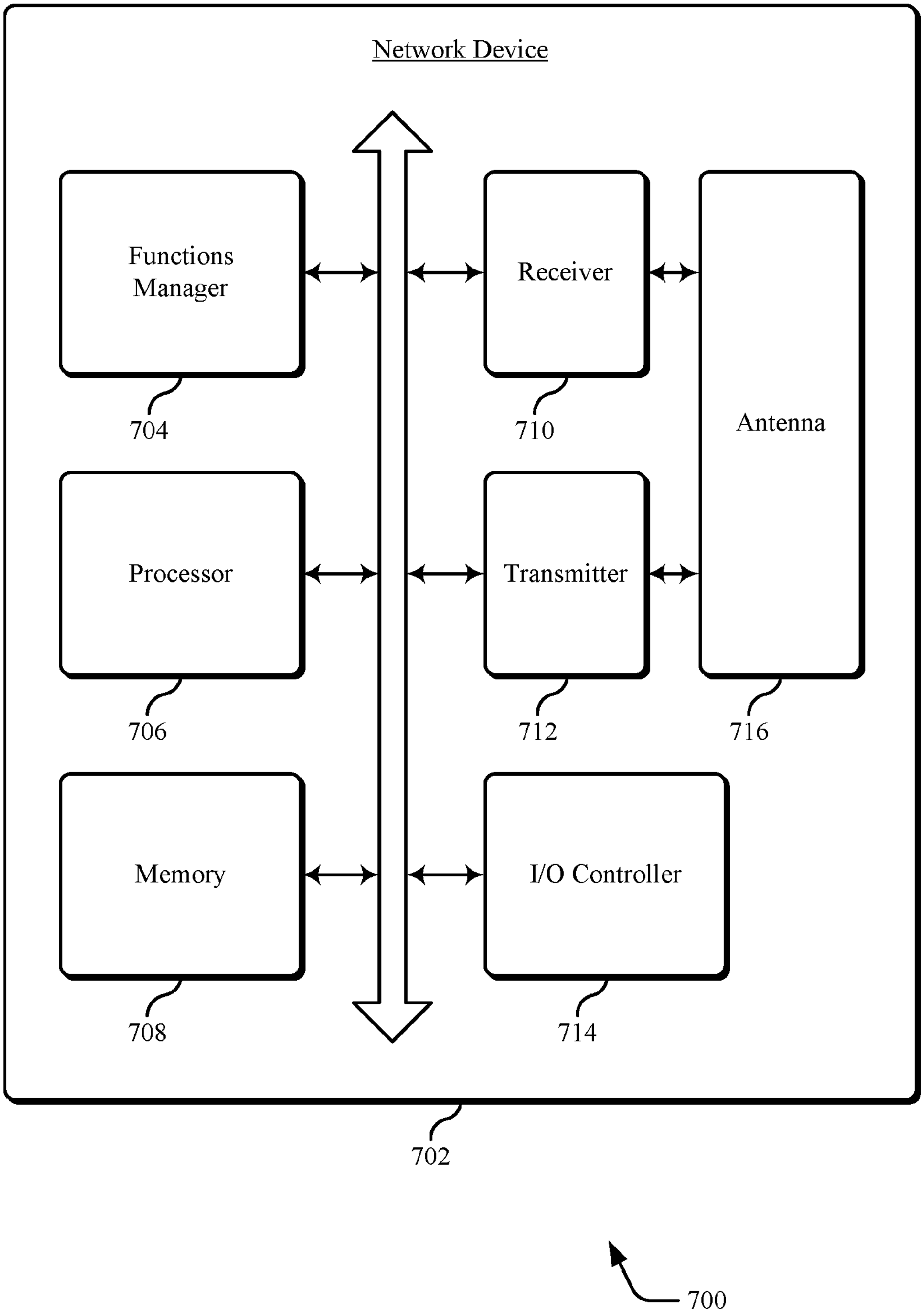
FIG. 7 illustrates an example block diagram of components of a device (e.g., a network device that implements a CAPIF function or CNF) that supports secure user consent data notification in accordance with aspects of the present disclosure.

FIG. 7 illustrates an example of a block diagram 700 of a device 702 that supports secure user consent data notification in accordance with aspects of the present disclosure. The device 702 may be an example of a network device that implements a CAPIF, a CCF, and/or any type of CNF, such as described herein. The device 702 may support wireless communication and/or network signaling with one or more base stations 102, UEs 104, other core network devices and functions (e.g., core network 106), or any combination thereof. The device 702 may include components for bi-directional communications including components for transmitting and receiving communications, such as a functions manager 704, a processor 706, a memory 708, a receiver 710, a transmitter 712, and an I/O controller 714. These components may be in electronic communication or otherwise coupled (e.g., operatively, communicatively, functionally, electronically, electrically) via one or more interfaces (e.g., buses).

The functions manager 704, the receiver 710, the transmitter 712, or various combinations thereof or various components thereof may be examples of means for performing various aspects of the present disclosure as described herein. For example, the functions manager 704, the receiver 710, the transmitter 712, or various combinations or components thereof may support a method for performing one or more of the functions described herein.

In some implementations, the functions manager 704, the receiver 710, the transmitter 712, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some implementations, the processor 706 and the memory 708 coupled with the processor 706 may be configured to perform one or more of the functions described herein (e.g., by executing, by the processor 706, instructions stored in the memory 708).

Additionally or alternatively, in some implementations, the functions manager 704, the receiver 710, the transmitter 712, or various combinations or components thereof may be implemented in code (e.g., as communications management software or firmware) executed by the processor 706. If implemented in code executed by the processor 706, the functions of the functions manager 704, the receiver 710, the transmitter 712, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some implementations, the functions manager 704 may be configured to perform various operations (e.g., receiving, monitoring, transmitting) using or otherwise in cooperation with the receiver 710, the transmitter 712, or both. For example, the functions manager 704 may receive information from the receiver 710, send information to the transmitter 712, or be integrated in combination with the receiver 710, the transmitter 712, or both to receive information, transmit information, or perform various other operations as described herein. Although the functions manager 704 is illustrated as a separate component, in some implementations, one or more functions described with reference to the functions manager 704 may be supported by or performed by the processor 706, the memory 708, or any combination thereof. For example, the memory 708 may store code, which may include instructions executable by the processor 706 to cause the device 702 to perform various aspects of the present disclosure as described herein, or the processor 706 and the memory 708 may be otherwise configured to perform or support such operations.

For example, the functions manager 704 may support wireless communication and/or network signaling at a device (e.g., the device 702, core network device) in accordance with examples as disclosed herein. The functions manager 704 and/or other device components may be configured as or otherwise support an apparatus, such as a network device, including a transceiver; a processor coupled to the transceiver, the processor and the transceiver configured to cause the apparatus to: receive, from a user equipment, information to trigger a user consent provisioning procedure; receive a resource owner data exposure notification comprising at least user consent data; store the user consent data at least one of local to a common application programming interface framework, or on network storage by a network storage function; and transmit, to the user equipment, a data exposure response acknowledgement that indicates the user consent data is stored for reference of the user consent.

Additionally, the apparatus (e.g., a network device) includes any one or combination of: the processor and the transceiver are configured to cause the apparatus to establish a secure session with the user equipment using a shared key derived from a common application programming interface framework key. A refresh parameter includes one or more of a counter, a nonce, or random number to generate a new key from the shared key for the secure session. The processor is configured to cause the apparatus to: obtain user equipment identifying data that is stored locally; utilize the user equipment identifying data and the refresh parameter as input for key generation of the new key to establish the secure session between the user equipment and a common application programming interface framework function; and form a key derivation function input for key generation, the input comprising one or more of: a resource owner identifier, a user equipment identifier, a refresh parameter, an application identifier, an application programming interface exposing function identifier, or a common application programming interface framework function identifier. The processor and the transceiver are configured to cause the apparatus to receive a resource owner data exposure update notification comprising at least one or more of a user equipment identifier, a resource owner identifier, or updated user consent data. The processor and the transceiver are configured to cause the apparatus to receive a resource owner data exposure revoke notification indicating to revoke the user consent. The processor and the transceiver are configured to cause the apparatus to receive a resource owner data exposure delete notification indicating to delete the user consent data.

The functions manager 704 and/or other device components may be configured as or otherwise support a means for wireless communication and/or network signaling at a network device, including receiving, from a user equipment, information to trigger a user consent provisioning procedure; receiving a resource owner data exposure notification comprising at least user consent data; storing the user consent data at least one of local to a common application programming interface framework, or on network storage by a network storage function; and transmitting, to the user equipment, a data exposure response acknowledgement that indicates the user consent data is stored for reference of the user consent.

Additionally, network signaling at the network device includes any one or combination of: establishing a secure session with the user equipment using a shared key derived from a common application programming interface framework key. A refresh parameter includes one or more of a counter, a nonce, or random number to generate a new key from the shared key for the secure session. The method further comprising: obtaining user equipment identifying data that is stored locally; and utilizing the user equipment identifying data and the refresh parameter as input for key generation of the new key to establish the secure session between the user equipment and a common application programming interface framework. The method further comprising receiving a resource owner data exposure update notification comprising at least one or more of a user equipment identifier, a resource owner identifier, or updated user consent data. The method further comprising receiving a resource owner data exposure revoke notification indicating to revoke the user consent. The method further comprising receiving a resource owner data exposure delete notification indicating to delete the user consent data.

The processor 706 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some implementations, the processor 706 may be configured to operate a memory array using a memory controller. In some other implementations, a memory controller may be integrated into the processor 706. The processor 706 may be configured to execute computer-readable instructions stored in a memory (e.g., the memory 708) to cause the device 702 to perform various functions of the present disclosure.

The memory 708 may include random access memory (RAM) and read-only memory (ROM). The memory 708 may store computer-readable, computer-executable code including instructions that, when executed by the processor 706 cause the device 702 to perform various functions described herein. The code may be stored in a non-transitory computer-readable medium such as system memory or another type of memory. In some implementations, the code may not be directly executable by the processor 706 but may cause a computer (e.g., when compiled and executed) to perform functions described herein. In some implementations, the memory 708 may include, among other things, a basic I/O system (BIOS) which may control basic hardware or software operation such as the interaction with peripheral components or devices.

The I/O controller 714 may manage input and output signals for the device 702. The I/O controller 714 may also manage peripherals not integrated into the device 702. In some implementations, the I/O controller 714 may represent a physical connection or port to an external peripheral. In some implementations, the I/O controller 714 may utilize an operating system such as iOS®, ANDROID®, MS-DOS®, MS-WINDOWS®, OS/2®, UNIX®, LINUX®, or another known operating system. In some implementations, the I/O controller 714 may be implemented as part of a processor, such as the processor 706. In some implementations, a user may interact with the device 702 via the I/O controller 714 or via hardware components controlled by the I/O controller 714.

In some implementations, the device 702 may include a single antenna 716. However, in some other implementations, the device 702 may have more than one antenna 716, which may be capable of concurrently transmitting or receiving multiple wireless transmissions. The receiver 710 and the transmitter 712 may communicate bi-directionally, via the one or more antennas 716, wired, or wireless links as described herein. For example, the receiver 710 and the transmitter 712 may represent a wireless transceiver and may communicate bi-directionally with another wireless transceiver. The transceiver may also include a modem to modulate the packets, to provide the modulated packets to one or more antennas 716 for transmission, and to demodulate packets received from the one or more antennas 716.

Figure 8:
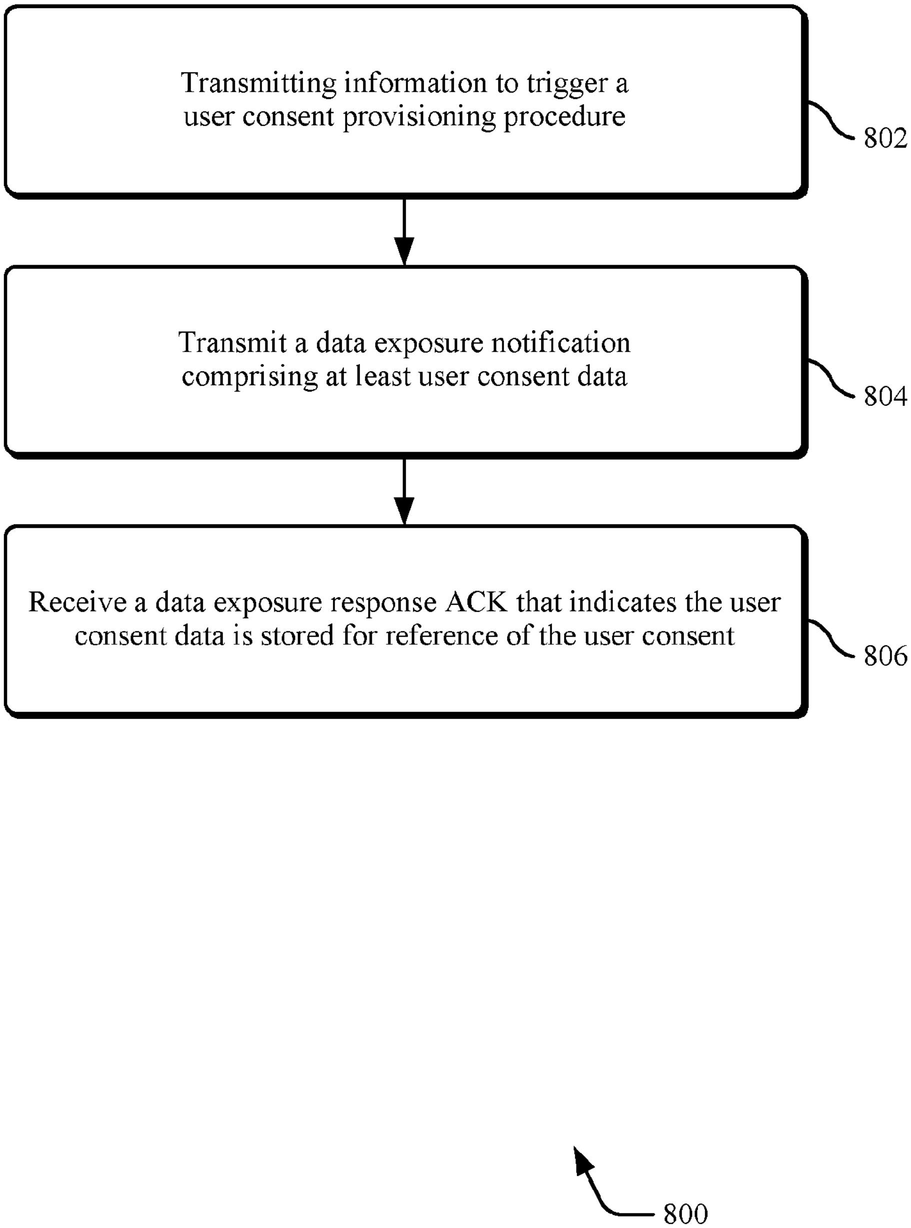
FIGS. 8, 9, 10, and 11 illustrate flowcharts of methods that support secure user consent data notification in accordance with aspects of the present disclosure.

FIG. 8 illustrates a flowchart of a method 800 that supports secure user consent data notification in accordance with aspects of the present disclosure. The operations of the method 800 may be implemented by a device or its components as described herein. For example, the operations of the method 800 may be performed by a device, such as UE 104 as described with reference to FIGS. 1 through 7. In some implementations, the device may execute a set of instructions to control the function elements of the device to perform the described functions. Additionally, or alternatively, the device may perform aspects of the described functions using special-purpose hardware.

At 802, the method may include transmitting information to trigger a user consent provisioning procedure. The operations of 802 may be performed in accordance with examples as described herein. In some implementations, aspects of the operations of 802 may be performed by a device as described with reference to FIG. 1.

At 804, the method may include transmitting a data exposure notification comprising at least user consent data. The operations of 804 may be performed in accordance with examples as described herein. In some implementations, aspects of the operations of 804 may be performed by a device as described with reference to FIG. 1.

At 806, the method may include receiving a data exposure response acknowledgement that indicates the user consent data is stored for reference of the user consent. The operations of 806 may be performed in accordance with examples as described herein. In some implementations, aspects of the operations of 806 may be performed by a device as described with reference to FIG. 1.

Figure 9:
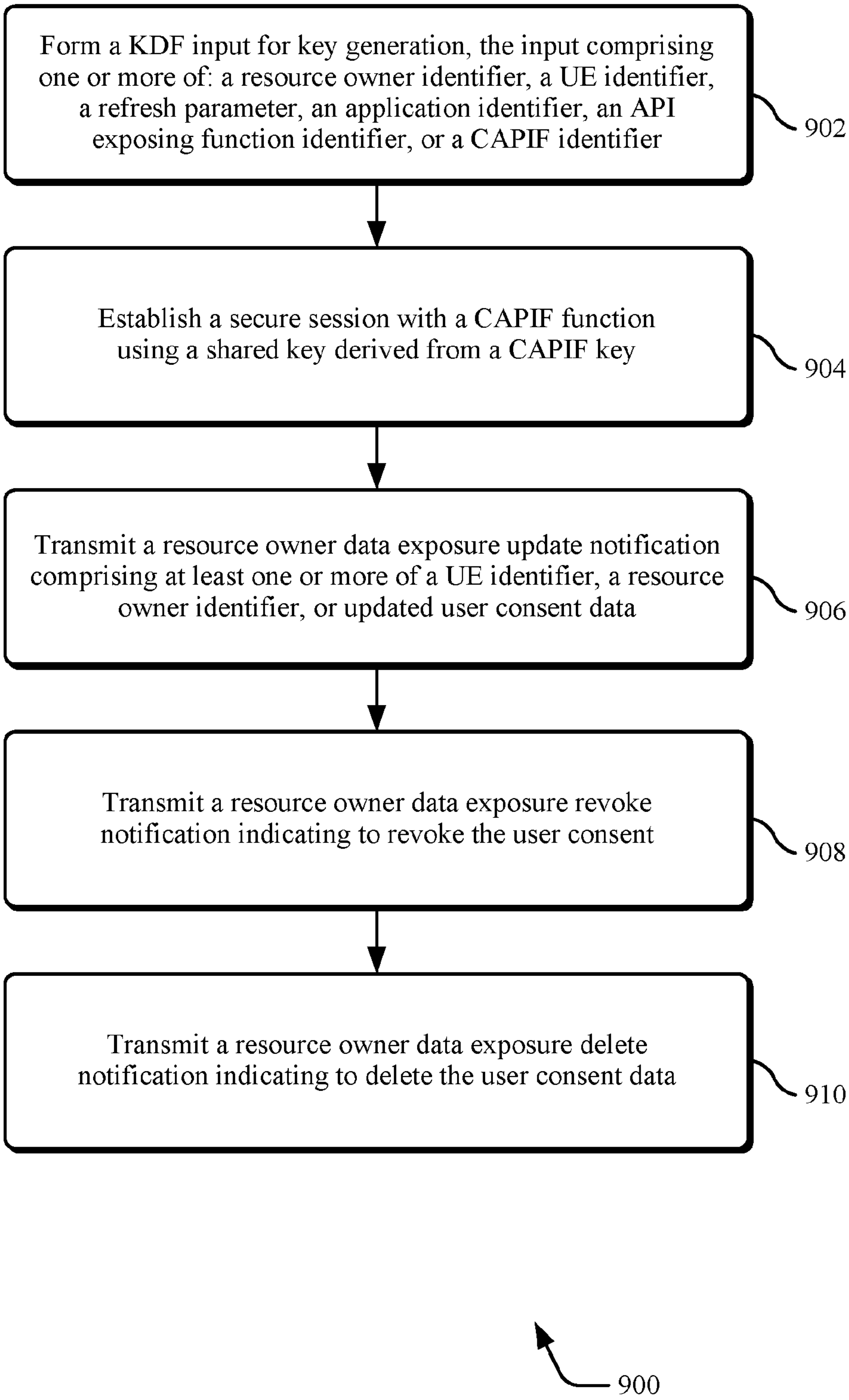

FIG. 9 illustrates a flowchart of a method 900 that supports secure user consent data notification in accordance with aspects of the present disclosure. The operations of the method 900 may be implemented by a device or its components as described herein. For example, the operations of the method 900 may be performed by a device, such as UE 104 as described with reference to FIGS. 1 through 7. In some implementations, the device may execute a set of instructions to control the function elements of the device to perform the described functions. Additionally, or alternatively, the device may perform aspects of the described functions using special-purpose hardware.

At 902, the method may include forming a key derivation function input for key generation, the input comprising one or more of: a resource owner identifier, a UE identifier, a refresh parameter, an application identifier (i.e., related to an application client or function or server), an application programming interface exposing function identifier, or a CAPIF identifier. The operations of 902 may be performed in accordance with examples as described herein. In some implementations, aspects of the operations of 902 may be performed by a device as described with reference to FIG. 1.

At 904, the method may include establishing a secure session with a CAPIF function using a shared key derived from a CAPIF key. The operations of 904 may be performed in accordance with examples as described herein. In some implementations, aspects of the operations of 904 may be performed by a device as described with reference to FIG. 1.

At 906, the method may include transmitting a resource owner data exposure update notification comprising at least one or more of a UE identifier, a resource owner identifier, or updated user consent data. The operations of 906 may be performed in accordance with examples as described herein. In some implementations, aspects of the operations of 906 may be performed by a device as described with reference to FIG. 1.

At 908, the method may include transmitting a resource owner data exposure revoke notification indicating to revoke the user consent. The operations of 908 may be performed in accordance with examples as described herein. In some implementations, aspects of the operations of 908 may be performed by a device as described with reference to FIG. 1.

At 910, the method may include transmitting a resource owner data exposure delete notification indicating to delete the user consent data. The operations of 910 may be performed in accordance with examples as described herein. In some implementations, aspects of the operations of 910 may be performed by a device as described with reference to FIG. 1.

Figure 10:
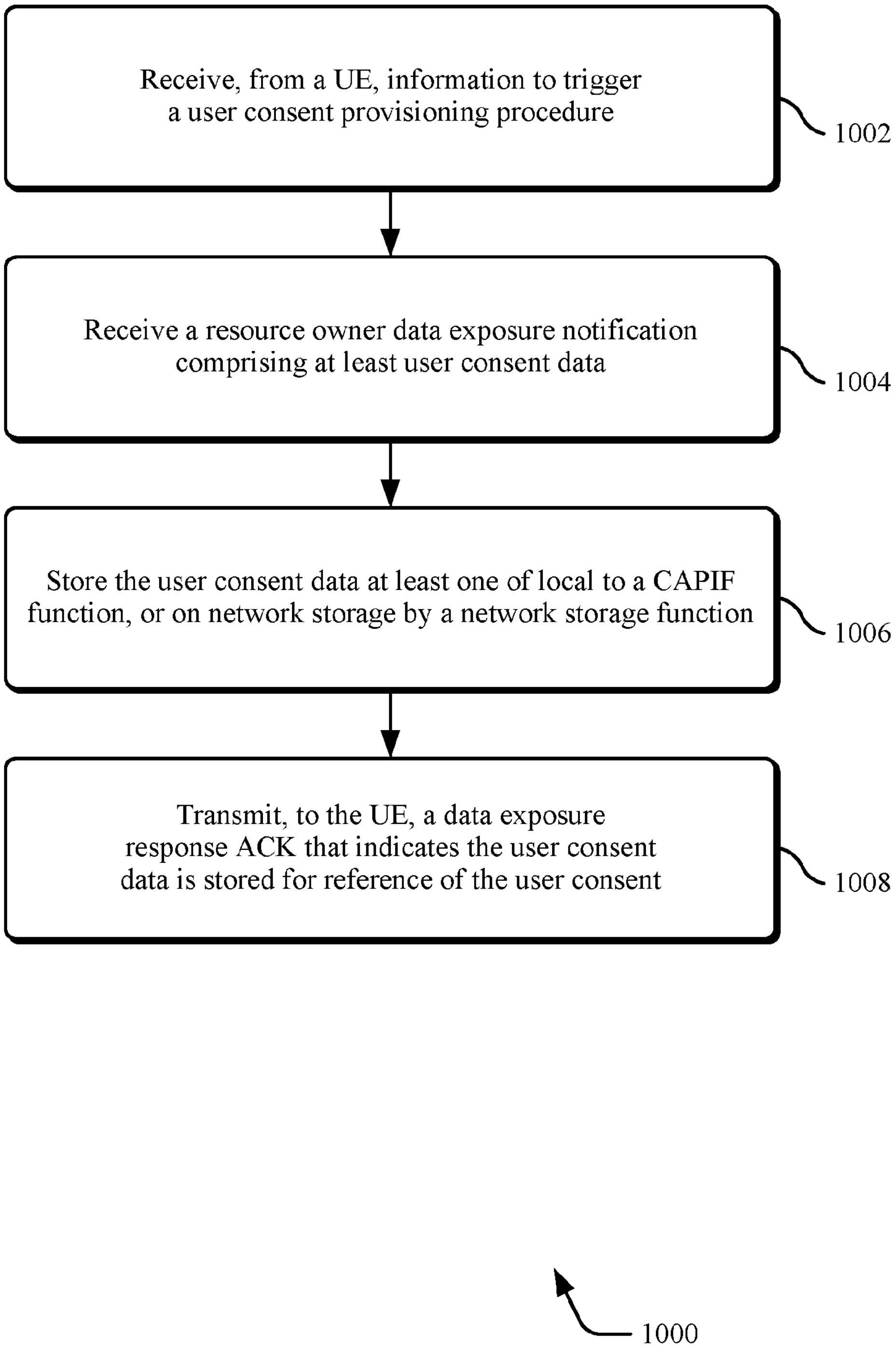

FIG. 10 illustrates a flowchart of a method 1000 that supports secure user consent data notification in accordance with aspects of the present disclosure. The operations of the method 1000 may be implemented by a device or its components as described herein. For example, the operations of the method 1000 may be performed by an apparatus that implements a CAPIF function or a CNF, such as described with reference to FIGS. 1 through 7. In some implementations, the device may execute a set of instructions to control the function elements of the device to perform the described functions. Additionally, or alternatively, the device may perform aspects of the described functions using special-purpose hardware.

At 1002, the method may include receiving, from a UE, information to trigger a user consent provisioning procedure. The operations of 1002 may be performed in accordance with examples as described herein. In some implementations, aspects of the operations of 1002 may be performed by a device as described with reference to FIG. 1.

At 1004, the method may include receiving a resource owner data exposure notification comprising at least user consent data. The operations of 1004 may be performed in accordance with examples as described herein. In some implementations, aspects of the operations of 1004 may be performed by a device as described with reference to FIG. 1.

At 1006, the method may include storing the user consent data at least one of local to a CAPIF function, or on network storage by a network storage function. The operations of 1006 may be performed in accordance with examples as described herein. In some implementations, aspects of the operations of 1006 may be performed by a device as described with reference to FIG. 1.

At 1008, the method may include transmitting, to the UE, a data exposure response acknowledgement that indicates the user consent data is stored for reference of the user consent. The operations of 1008 may be performed in accordance with examples as described herein. In some implementations, aspects of the operations of 1008 may be performed by a device as described with reference to FIG. 1.

Figure 11:
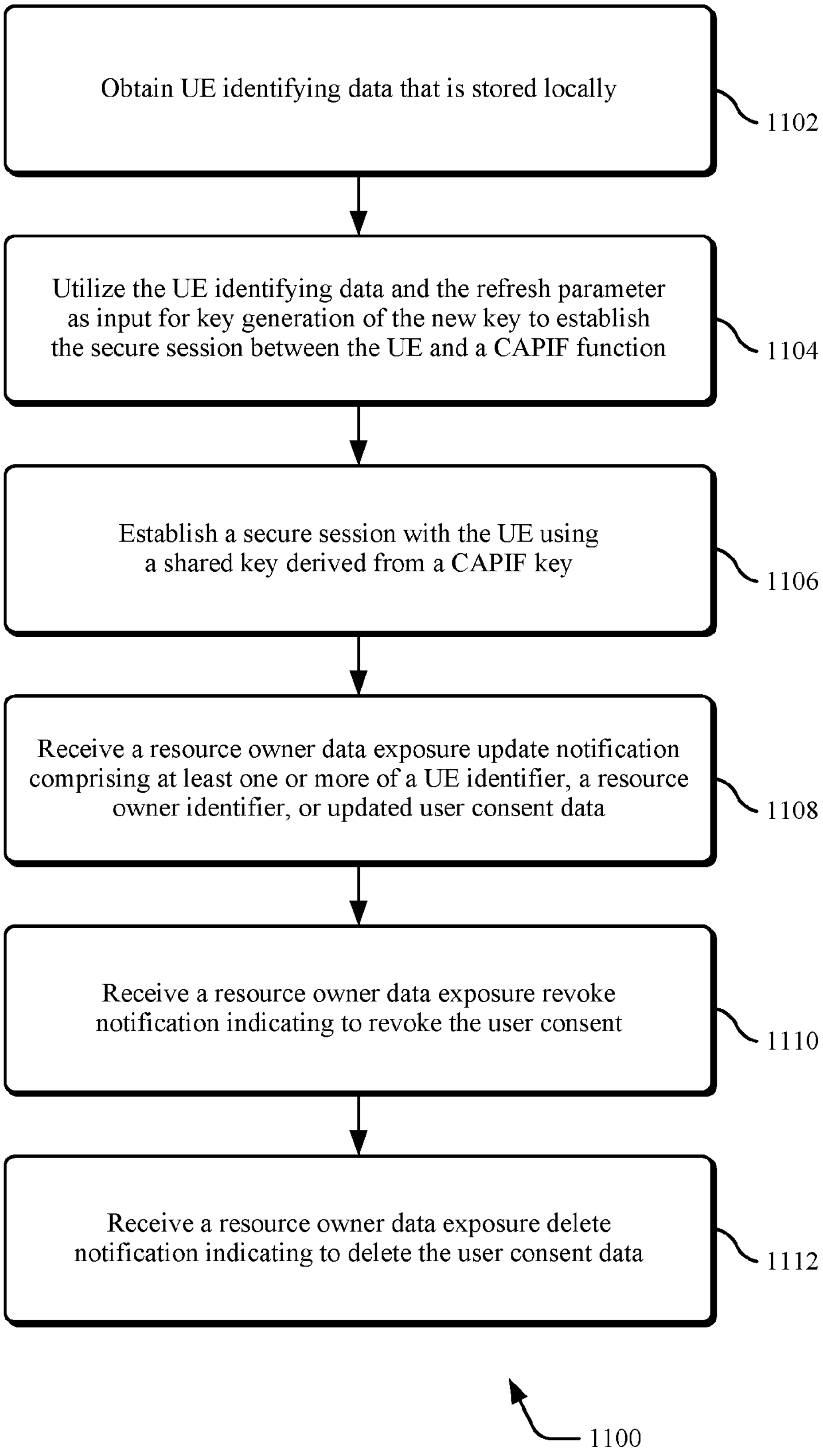

FIG. 11 illustrates a flowchart of a method 1100 that supports secure user consent data notification in accordance with aspects of the present disclosure. The operations of the method 1100 may be implemented by a device or its components as described herein. For example, the operations of the method 1100 may be performed by an apparatus that implements a CAPIF function or a CNF, such as described with reference to FIGS. 1 through 7. In some implementations, the device may execute a set of instructions to control the function elements of the device to perform the described functions. Additionally, or alternatively, the device may perform aspects of the described functions using special-purpose hardware.

At 1102, the method may include obtaining UE identifying data that is stored locally. The operations of 1102 may be performed in accordance with examples as described herein. In some implementations, aspects of the operations of 1102 may be performed by a device as described with reference to FIG. 1.

At 1104, the method may include utilizing the UE identifying data and the refresh parameter as input for key generation of the new key to establish the secure session between the UE and a CAPIF function. The operations of 1104 may be performed in accordance with examples as described herein. In some implementations, aspects of the operations of 1104 may be performed by a device as described with reference to FIG. 1.

At 1106, the method may include establishing a secure session with the UE using a shared key derived from a CAPIF key. The operations of 1106 may be performed in accordance with examples as described herein. In some implementations, aspects of the operations of 1106 may be performed by a device as described with reference to FIG. 1.

At 1108, the method may include receiving a resource owner data exposure update notification comprising at least one or more of a UE identifier, a resource owner identifier, or updated user consent data. The operations of 1108 may be performed in accordance with examples as described herein. In some implementations, aspects of the operations of 1108 may be performed by a device as described with reference to FIG. 1.

At 1110, the method may include receiving a resource owner data exposure revoke notification indicating to revoke the user consent. The operations of 1110 may be performed in accordance with examples as described herein. In some implementations, aspects of the operations of 1110 may be performed by a device as described with reference to FIG. 1.

At 1112, the method may include receiving a resource owner data exposure delete notification indicating to delete the user consent data. The operations of 1112 may be performed in accordance with examples as described herein. In some implementations, aspects of the operations of 1112 may be performed by a device as described with reference to FIG. 1.

It should be noted that the methods described herein describe possible implementations, and that the operations and the steps may be rearranged or otherwise modified and that other implementations are possible. Further, aspects from two or more of the methods may be combined. The order in which the methods are described is not intended to be construed as a limitation, and any number or combination of the described method operations may be performed in any order to perform a method, or an alternate method.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor.

Any connection may be properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C, or AB or AC or BC, or ABC (i.e., A and B and C). Similarly, a list of one or more of A, B, or C means A or B or C, or AB or AC or BC, or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on. Further, as used herein, including in the claims, a "set" may include one or more elements.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form to avoid obscuring the concepts of the described example.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE) for wireless communication, comprising:

at least one memory; and at least one processor coupled with the at least one memory and configured to cause the UE to:

transmit information including one or more security parameters to a common application programming interface (API) framework function to trigger a user consent provisioning procedure;

establish a secure session with the common API framework function using a shared key derived based at least in part on the one or more security parameters and a common API framework key;

transmit, via the secure session, a data exposure notification comprising at least user consent data; and receive a data exposure response acknowledgement that indicates the user consent data is stored for reference of a user consent.

2. The UE of claim 1, wherein the user consent data is one of stored local to a common application programming interface framework, or stored on network storage by a network storage function.

3. The UE of claim 1, wherein the information is a resource owner data notification trigger transmitted to a common application programming interface framework of a network after the UE is registered to the network.

4. The UE of claim 1, wherein the information is a resource owner data notification trigger transmitted to a core network function of a network, bypassing one or more of another core network function or a common application programming interface framework of the network.

5. The UE of claim 1, wherein the data exposure notification is a resource owner data exposure notification comprising at least one or more of a UE identifier, a resource owner identifier, or the user consent data.

6. The UE of claim 1, wherein the at least one processor is configured to cause the UE to form a key derivation function input for key generation, the key derivation function input comprising one or more of: a resource owner identifier, a UE identifier, a refresh parameter, an application identifier, an application programming interface exposing function identifier, or a common application programming interface framework function identifier.

7. The UE of claim 1, wherein the one or more security parameters comprise a refresh parameter that includes one or more of a counter, a nonce, or random number to generate a new key from the shared key for the secure session.

8. The UE of claim 1, wherein the at least one processor is configured to cause the UE to transmit a resource owner data exposure update notification comprising at least one or more of a UE identifier, a resource owner identifier, or updated user consent data.

9. The UE of claim 1, wherein the at least one processor is configured to cause the UE to transmit a resource owner data exposure revoke notification indicating to revoke the user consent.

10. The UE of claim 1, wherein the user consent data comprises a user consent data set including at least an application identifier, one or more service data types, and a consent status.

11. A network device for wireless communication, comprising:

at least one memory; and at least one processor coupled with the at least one memory and configured to cause the network device to:

receive, from a user equipment (UE), information including one or more security parameters to trigger a user consent provisioning procedure;

establish a secure session with the UE using a shared key derived based at least in part on the one or more security parameters and a common application programming interface (API) framework key;

receive, via the secure session, a resource owner data exposure notification comprising at least user consent data;

store the user consent data at least one of local to a common application programming interface framework, or on network storage by a network storage function; and transmit, to the UE, a data exposure response acknowledgement that indicates the user consent data is stored for reference of a user consent.

12. The network device of claim 11, wherein the one or more security parameters comprise a refresh parameter that includes one or more of a counter, a nonce, or random number to generate a new key from the shared key for the secure session.

13. The network device of claim 12, wherein the at least one processor is configured to cause the network device to:

obtain UE identifying data that is stored locally;

utilize the UE identifying data and the refresh parameter as input for key generation of the new key to establish the secure session between the UE and a common application programming interface framework function; and form a key derivation function input for the key generation, the input comprising one or more of: a resource owner identifier, a UE identifier, the refresh parameter, an application identifier, an application programming interface exposing function identifier, or a common application programming interface framework function identifier.

14. The network device of claim 11, wherein the user consent data comprises a user consent data set including at least an application identifier, one or more service data types, and a consent status.

15. A method performed by a user equipment (UE), the method comprising:

transmitting information including one or more security parameters to a common application programming interface (API) framework function to trigger a user consent provisioning procedure;

establishing a secure session with the common API framework function using a shared key derived based at least in part on the one or more security parameters and a common API framework key;

transmitting, via the secure session, a data exposure notification comprising at least user consent data; and receiving a data exposure response acknowledgement that indicates the user consent data is stored for reference of a user consent.

16. The method of claim 15, further comprising:

transmitting a resource owner data exposure update notification comprising at least one or more of a UE identifier, a resource owner identifier, or updated user consent data.

17. The method of claim 15, further comprising:

transmitting a resource owner data exposure revoke notification indicating to revoke the user consent.

18. The method of claim 15, wherein the one or more security parameters comprise a refresh parameter that includes one or more of a counter, a nonce, or random number to generate a new key from the shared key for the secure session.

19. The method of claim 15, wherein the user consent data comprises a user consent data set including at least an application identifier, one or more service data types, and a consent status.

20. A processor for wireless communication, comprising:

at least one controller coupled with at least one memory and configured to cause the processor to:

transmit information including one or more security parameters to a common application programming interface (API) framework function to trigger a user consent provisioning procedure;

establish a secure session with the common API framework function using a shared key derived based at least in part on the one or more security parameters and a common API framework key;

transmit, via the secure session, a data exposure notification comprising at least user consent data; and receive a data exposure response acknowledgement that indicates the user consent data is stored for reference of a user consent.

* * * * *